United States Patent
Udupa et al.

(10) Patent No.: US 12,502,146 B2
(45) Date of Patent: Dec. 23, 2025

(54) DEEP LEARNING NETWORK FOR THE ANALYSIS OF BODY TISSUE COMPOSITION ON BODY-TORSO-WIDE CT IMAGES

(71) Applicant: THE TRUSTEES OF THE UNIVERSITY OF PENNSYLVANIA, Philadelphia, PA (US)

(72) Inventors: Jayaram K. Udupa, Gladwyne, PA (US); Tiange Liu, Qinhuangdao (CN); Yubing Tong, Chesterbroook, PA (US); Drew A. Torigian, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 510 days.

(21) Appl. No.: 17/908,730

(22) PCT Filed: Mar. 4, 2021

(86) PCT No.: PCT/US2021/020818
§ 371 (c)(1),
(2) Date: Sep. 1, 2022

(87) PCT Pub. No.: WO2021/178632
PCT Pub. Date: Sep. 10, 2021

(65) Prior Publication Data
US 2023/0129957 A1   Apr. 27, 2023

Related U.S. Application Data

(60) Provisional application No. 62/985,220, filed on Mar. 4, 2020.

(51) Int. Cl.
*G06T 7/00* (2017.01)
*A61B 6/00* (2006.01)
(Continued)

(52) U.S. Cl.
CPC ............ *A61B 6/032* (2013.01); *A61B 6/5217* (2013.01); *G06T 7/0012* (2013.01); *G06T 7/10* (2017.01); *G06T 2207/20084* (2013.01)

(58) Field of Classification Search
CPC ....... A61B 6/032; A61B 6/5217; A61B 6/037; A61B 6/482; A61B 6/505; A61B 6/03;
(Continued)

(56) References Cited

U.S. PATENT DOCUMENTS

| | | | |
|---|---|---|---|
| 2017/0091574 A1* | 3/2017 | Udupa | ........... G06T 7/11 |
| 2018/0165808 A1 | 6/2018 | Bagci et al. | |
| 2019/0259159 A1 | 8/2019 | Udupa et al. | |

FOREIGN PATENT DOCUMENTS

WO    2019/051358 A1    3/2019

OTHER PUBLICATIONS

Achamrah N et al, "Validity of Predictive Equations for Resting Energy Expenditure Developed for Obese Patients: Impact of Body Composition Method," Nutrients, vol. 10, Issue 1, 2018, 63.
(Continued)

*Primary Examiner* — Duy M Dang
(74) *Attorney, Agent, or Firm* — BakerHostetler

(57) ABSTRACT

Methods and systems are described for determining body composition information. An example method can comprise receiving imaging data associated with a patient, causing the imaging data to be input into a convolutional neural network stored on one or more computing devices, determining, based on output data resulting from inputting the imaging data into the convolutional neural network, body composition information, and causing output of the body composition information.

15 Claims, 8 Drawing Sheets

(51) Int. Cl.
 A61B 6/03 (2006.01)
 G06T 7/10 (2017.01)
(58) Field of Classification Search
 CPC ..... A61B 5/4869; A61B 5/055; A61B 5/4519;
 A61B 5/7267; A61B 5/4872; A61B
 6/5235; A61B 34/10; A61B 5/00; G06T
 7/11; G06T 7/187; G06T 7/0012; G06T
 7/10; G06T 2207/20084; G16H 30/40;
 G16H 50/20
 See application file for complete search history.

(56) References Cited

OTHER PUBLICATIONS

Anderson M R. et al., "A non-linear relationship between visceral adipose tissue and frailty in adult lung transplant candidates," Am J Transpl, vol. 19, 2019, pp. 3155-3161.

Anderson M R. et al., Adipose tissue quantification and primary graft dysfunction after lung transplantation: The Lung Transplant Body Composition Study, JHeart Lung Transpl, vol. 38, Issue 12, 2019, pp. 1246-1256.

Asghar A. et al., "Role of immune cells in obesity induced low grade inflammation and insulin resistance," Cell Immunol, vol. 315, 2017, pp. 18-26.

Bridge C P. et al., Fully-Automated Analysis of Body Composition from CT in Cancer Patients Using Convolutional Neural Networks, in Proc. WorkshopMICCAI, 2018, pp. 204-213.

Cappabianco F.A.M., et al., "A critical analysis of the methods of evaluating MRI brain segmentation algorithms," in Proc ICIP, 2017, pp. 3894-3898.

Chen et al., "Low-Dose CT with a residual encoder-decoder convolutional neural network (RED-CNN)," IEEE Transactions on Medical Imaging, vol. 36, Issue 12, 2017, pp. 2524-2535.

Cheng X. et al., "The optimal anatomic site for a single slice to estimate the total volume of visceral adipose tissue by using the quantitative computed tomography (QCT) in Chinese population," EurJClin Nutr, vol. 72, Issue 11, 2018, pp. 1567-1575.

Çiçek, et al, "3D U-Net: Learning Dense Volumetric Segmentation from Sparse Annotation," in Proc MICCAI. 2016, pp. 424-432.

Duda K, et al, "Human Body Composition and Muscle Mass," Muscle and Exercise Physiology, Chapter 1, 2019, pp. 3-26.

Duren DL. et al., "Body composition methods: comparisons and interpretation," J. Diabetes Sci Technol, vol. 2, Issue 6, 2008, pp. 1139-1146.

Falcao A X, et al., "User-steered image segmentation paradigms: Live wire and live lane," Graphical models and Image Process, vol. 60, Issue 4, 1998, pp. 233-260.

Fox CS. et al., Abdominal visceral and subcutaneous adipose tissue compartments: association with metabolic risk factors in the Framingham Heart Study, Circulation, vol. 116, 2007, pp. 39-48.

Fuchs G, et al., "Quantifying the effect of slice thickness, intravenous contrast and tube current on muscle segmentation: Implications for body composition analysis.," Eur Radiol, vol. 28, Issue 6, 2018, pp. 1-9.

Gibson E, et al., Automatic Multi-organ Segmentation on Abdominal CT with Dense V-networks, IEEE Trans Med Imaging, vol. 37, Issue 8, 2018, pp. 1822-1834.

Gibson E, et al., "NiftyNet: a deep-learning platform for medical imaging," Computer Methods and Programs in Biomedicine, vol. 158, May 2018, pp. 113-122.

Glorot et al., "Deep sparse rectifier neural networks," Proc AISTATS, 2011, pp. 315-323.

Grevera, G, et al, "CAVASS: A computer-assisted visualization and analysis software system," J Digital Imaging, vol. 20, 2007, pp. 101-118.

He K, et al., "Identity Mappings in Deep Residual Networks," in Proc ECCV, 2016, pp. 630-645.

Huang G, et al., "Densely connected convolutional networks," in Proc. CVPR, 2017, pp. 2261-2269.

Hussein S, et al., "Automatic Segmentation and Quantification of White and Brown Adipose Tissues from PET/CT Scans," IEEE Trans Med Imaging, vol. 36, Issue 3, 2016, pp. 734-744.

Ioffe S, et al., "Batch Normalization: Accelerating Deep Network Training by Reducing Internal Covariate Shift," in Proc ICML, 2015, pp. 448-456.

Irmakei I, et al., A Novel Extension to Fuzzy Connectivity for Body Composition Analysis: Applications in Thigh, Brain, and Whole Body Tissue Segmentation, IEEE Trans Biomed Eng, vol. 66, Issue 4, 2019, pp. 1069-1081.

Jeanson A L, et al., Body composition estimation from selected slices: equations computed from a new semi-automatic thresholding method developed on whole-body CT scans, Peerj, vol. 5, 2017, e3302.

Kamnitsas K, et al., "Efficient multi-scale 3D CNN with fully connected CRF for accurate brain lesion segmentation," Medical Image Analysis, vol. 36, Feb. 2017, pp. 61-78.

Kang et al., "A deep convolutional neural network using directional wavelets for low-dose X-ray CT reconstruction," Medical Physics, vol. 44, Issue 10, 2017, pp. 360-375.

Kershaw E E, et al, "Adipose tissue as an endocrine organ," J Clin Endocrinol Metab, vol. 89, Issue 6, 2004, pp. 2548-2556.

Kim Y J et al., "Computerized Automated Quantification of Subcutaneous and Visceral Adipose Tissue From Computed Tomography Scans: Development and Validation Study," J Mir Med Inf, vol. 4, Issue 1, 2016, e2.

Kullberg J et al., Automated analysis of liver fat, muscle and adipose tissue distribution from CT suitable for large-scale studies., Sci Rep., vol. 7, Issue 1, 2017, 10425.

Lee H, et al, "Pixel-level deep segmentation: artificial intelligence quantifies muscle on computed tomography for body morphometric analysis," J Digital Imaging, vol. 30, Issue 4, 2017, pp. 487-498.

Lemos T, et al., "Current body composition measurement techniques," Curr Opin Endocrinol Diabetes Obes, vol. 24, Issue 5, 2017, pp. 310-314.

Lin M. et al., Network in Network, 2015.

Liu T, et al. "Quantification of body-torso-wide tissue composition on low-dose CT images via automatic anatomy recognition," Med Phys, vol. 46, Issue 3, 2019, pp. 1272-1285.

Long J. et al., "Fully Convolutional Networks for Semantic Segmentation," IEEE Trans Pattern AnalMach Intell, vol. 39, Issue 4, 2014, pp. 640-651.

Loshchilov I. et al., "SGDR: Stochastic gradient descent with warm restarts," m Proc ICLR, 2017.

Martinez-Martinez F, et al., "Fully Automated Classification of Bone Marrow Infiltration in Low-Dose CT of Patients with Multiple Myeloma Based on Probabilistic Density Model and Supervised Learning," Comput Biol Med, vol. 71, 2016, pp. 57-66.

Mazzoccoli G. "Body composition: where and when," Eur J Radiol, vol. 85, 2016, pp. 1456-1460.

Mcdonald A M et al., "CT Measures of Bone Mineral Density and Muscle Mass Can be Used to Predict Noncancer Death in Men with Prostate Cancer," Radiology, vol. 282, Issue 2, 2017, pp. 475-483.

Milletari F, et al., "V-Net: Fully Convolutional Neural Networks for Volumetric Medical Image Segmentation," in Proc 3DV, 2016, pp. 565-571.

Moeskops et al., "Automatic segmentation of MR Brain Images with a Convolutional Neural Network", IEEE Transactions on Medical Imaging, vol. 35, Issue 5, 2016, pp. 1252-1261.

Mourtzakis M, et al, "A practical and precise approach to quantification of body composition in cancer patients using computed tomography images acquired during routine care," Appl Physiol, Nutr, Metab, vol. 33, issue 5, 2008, pp. 997-1006.

Pleiss G, et al. "Memory-Efficient Implementation of DenseNets," 2017.

Popuri K et al., "Body Composition Assessment in Axial CT Images Using FEM-Based Automatic Segmentation of Skeletal Muscle," IEEE Trans MedImaging, vol. 35, Issue 2, 2016, pp. 512-520.

Ronneberger O, et al., "U-Net: Convolutional Networks for Biomedical Image Segmentation," mProcMICCAI, 2015, pp. 234-241.

(56) References Cited

OTHER PUBLICATIONS

Sebastiano. K.M.D. et al., "A critical evaluation of body composition modalities used to assess adipose and skeletal muscle tissue in cancer," Appl Physiol, Nutr, Metab, vol. 37, Issue37, 2012, pp. 811-821.

Shashaty, MGS et al., Computed tomography-defined abdominal adiposity is associated with acute kidney injury in critically ill trauma patients., Crit Care Med, vol. 42, 2014, pp. 1619-1628.

Shen N. et al., "Automated and accurate quantification of subcutaneous and visceral adipose tissue from magnetic resonance imaging based on machine learning," Magnetic Resonance Imaging, vol. 64, Dec. 2019, pp. 28-36.

Snyder et al., "Report of the task group on reference man", Pergamon Press, Oxford, 1974.

Srikumar T. et al., Semiautomated Measure of Abdominal Adiposity Using Computed Tomography Scan Analysis, J Surg Res, vol. 237, 2019, pp. 12--21.

Sudre C H. et al, Generalised dice overlap as a deep learning loss function for highly unbalanced segmentations, in Proc. Workshops DLMIA and ML-CDS, 2017, pp. 240-248.

Suzuki et al., "Neural network convolution (NNC) for converting Ultra-Low-Dose to "Virtual" High-Dose CT Images," International workshop on Machine learning in medical imaging, Springer, 2017, pp. 334-343.

Sze V, et al., "Efficient Processing of Deep Neural Networks: A Tutorial and Survey," Proc. IEEE, vol. 105, Issue 12, 2017, pp. 2295-2329.

Szegedy C, et al., "Going Deeper with Convolutions," in Proc. CVPR, 2015, pp. 1-9.

Tewari N, et al., "A comparison of three methods to assess body composition," Nutrition, vol. 47, 2018 pp. 1-5.

Tong Y, et al, "MR image analytics to characterize upper airway structure in obese children with obstructive sleep apnea syndrome," PLOS ONE, vol. 11, Issue 8, 2016, e0159327.

Tong Y, et al., "Optimization of Abdominal Fat Quantification on CT Imaging Through Use of Standardized Anatomic Space: A Novel Approach," Med Phys, vol. 41, Issue 6, 2014, 063501.

Weston et al., "Automated Abdominal Segmentation of CT Scans for Body Composition Analysis Using Deep Learning," Radiology, vol. 290, 2019, pp. 669-679.

* cited by examiner

DEEP LEARNING NETWORK FOR THE ANALYSIS OF BODY TISSUE COMPOSITION ON BODY-TORSO-WIDE CT IMAGES

CROSS-REFERENCE TO RELATED APPLICATIONS

This application is the National Stage Application of International Patent Application No. PCT/US2021/020818, filed Mar. 4, 2021, which claims the benefit of U.S. Patent Provisional Application No. 62/985,220 filed Mar. 4, 2020, which is hereby incorporated by reference for any and all purposes.

BACKGROUND

Quantification of body tissue composition is important for research and clinical purposes, given the association between presence and severity of various disease conditions with the quantity and quality of body tissue composition. Radiologic imaging techniques such as magnetic resonance imaging and computed tomography (CT) imaging make accurate quantification of body composition possible. However, most current imaging-based methods need human interaction to quantify different tissues.

When dealing whole body images of many subjects, however, interactive methods become impractical. The few automated methods that exist either focus on a specific slice or a specific body region or a specific tissue type or have not achieved the level accuracy that is comparable to the precision of methods. Accordingly, there is a need for more sophisticated imaging techniques.

SUMMARY

Methods and systems are described for determining body composition information. An example method can comprise receiving imaging data associated with a patient, causing the imaging data to be input into a convolutional neural network stored on one or more computing devices, determining, based on output data resulting from inputting the imaging data into the convolutional neural network, body composition information, and causing output of the body composition information. Body composition information may comprise a tissue type, tissue category, composition type, composition category, and/or the like. Example tissue types, tissue categories, composition types, composition categories and/or the like may comprise adipose tissue (e.g., fat tissue), types of adipose tissue, muscle tissue, types of muscle tissue, skeletal tissue, types of skeletal tissue, any combination thereof, and/or the like. As few examples of body composition information include subcutaneous adipose tissue, visceral adipose tissue, muscle tissue, and skeletal tissue.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF ILLUSTRATIVE EMBODIMENTS

Figure 1:
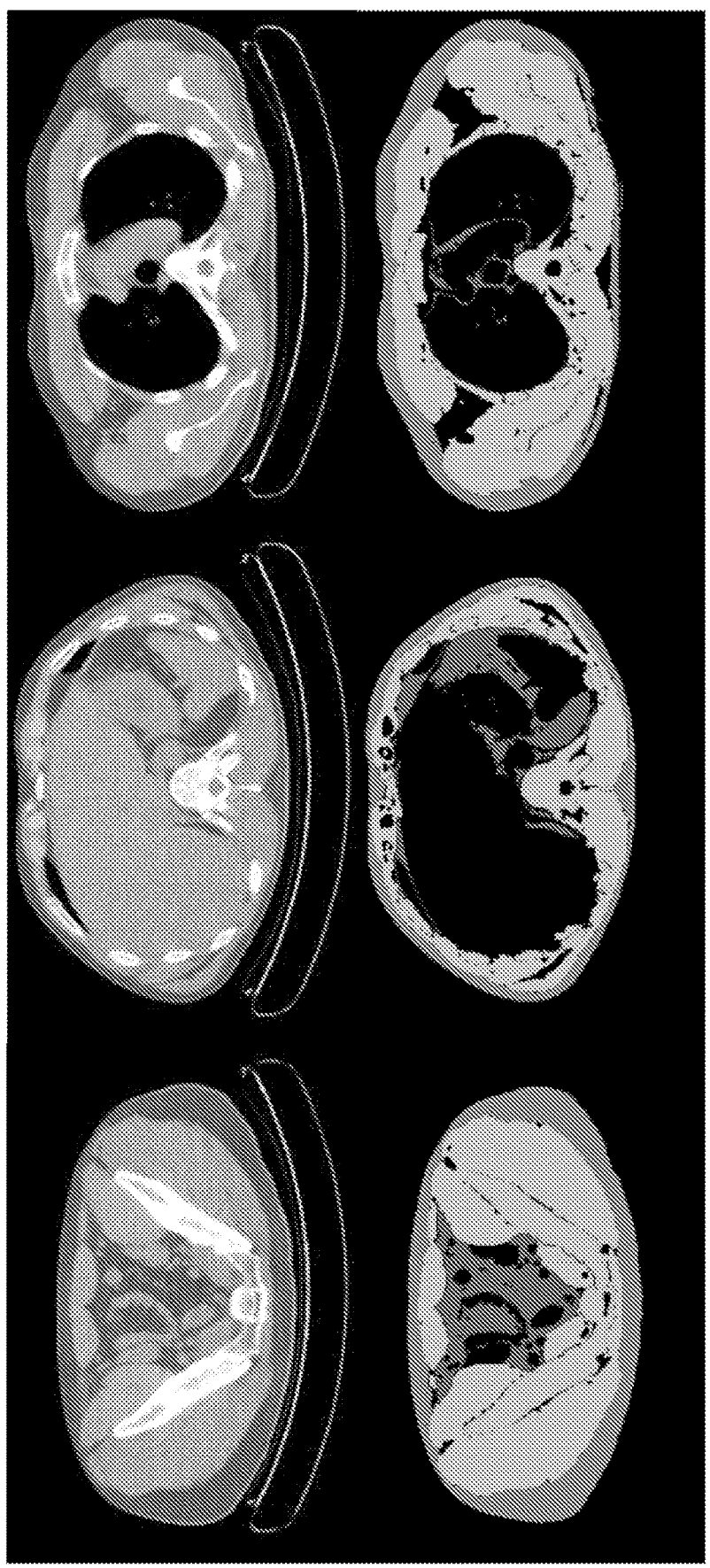
FIG. 1 illustrates some sample low-dose axial CT slices from three different (Plv, Abd, and Thx) levels in the body torso of a subject with color overlays that depict manual segmentations of the four tissues of interest.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, can also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

Disclosed is a novel approach to determining body composition. The approach includes a convolutional neural network, described herein as ABCNet. Accordingly, ABCNet may refer to any of the techniques disclosed herein to determine body composition using a machine learning model, such as an artificial neural network. The ABCNet strategy is an automated, efficient, highly accurate, practical, production mode tool for CT images to analyze body-wide composition of major tissue types. The disclosed approach aims to segment body tissues of interest, such as by identifying different categories and/or types body tissues. Example types and/or categories of body tissues comprise subcutaneous adipose tissue, visceral adipose tissue, skeletal muscle, and skeletal structures. The disclosed approach may segment body tissues of interest from body-torso-wide images, such as body-torso-wide low-dose computed tomography (CT) images. Low-dose computing tomography imaging may be any dose less than conventional techniques and/or may vary according to application.

The performance of ABCNet is compared with other networks that are available for medical image segmentation including DeepMedic, VNet, Dense V-Net, and 3D-Unet by employing the same data sets and training-testing strategies. ABCNet outperformed all other networks in accuracy as expressed by Dice Coefficient which reached 92-98%, while most methods fell below 90% especially for muscle and VAT. On a modern but ordinary workstation with an ordinary GPU card, ABCNet took about 18 hours for training the network while delineating and quantifying all 4 tissues in one patient CT data set took about 12 seconds.

The proposed segmentation algorithm is accurate, robust, and very efficient in terms of both time and memory. The experimental results show that ABCNet achieves superior performance in both accuracy and efficiency of segmenting body tissues from body-torso-wide low-dose CT images compared to other state-of-the-art methods, reaching 92-98% in common accuracy metrics.

The disclosed methods may comprise using a Fully Convolutional Network. The connections in the network are shortened, condensed and adapted to body tissue quantification based on specific factors that the inventors have acquired through experience in the field (Fuzzy object recognition, etc).

Purpose: Quantification of body tissue composition is important for research and clinical purposes, given the association between presence and severity of several disease conditions, such as the incidence of cardiovascular and metabolic disorders, survival after chemotherapy, etc., with the quantity and quality of body tissue composition. The disclosed techniques aim to automatically segment four key body tissues of interest, namely subcutaneous adipose tissue, visceral adipose tissue, skeletal muscle, and skeletal structures from body-torso-wide low-dose computed tomography (CT) images.

Method: A novel neural network design named ABCNet is proposed. The neural network may comprise a residual Encode-Decode based architecture. The proposed system may make full use of multi-scale features from four resolution levels to improve the segmentation accuracy. This network may be built on a uniform convolutional unit and its derived units, which makes the ABCNet easy to implement. Several parameter compression methods, including Bottleneck, linear increasing feature maps in Dense Blocks, and efficient memory techniques are employed to lighten the network while making it deeper. The strategy of dynamic soft Dice loss may be introduced to optimize the network in two steps from coarse tuning to fine tuning. The proposed segmentation algorithm is accurate, robust, and very efficient in terms of both time and memory.

Results: A data set composed of 38 low-dose unenhanced CT images, with 25 male and 13 female subjects in the age range 31-83 years and ranging from normal to overweight to obese, is utilized to evaluate ABCNet. Four state-of-the-art methods are compared including DeepMedic, 3D U-Net, V-Net, Dense V-Net, against ABCNet on this data set. We employ a shuffle-split 5-fold cross-validation strategy: In each experimental group, 18, 5, and 15 CT images are randomly selected out of 38 CT image sets for training, validation, and testing, respectively. The commonly-used evaluation metrics—precision, recall, and F1-score (or Dice)—are employed to measure the segmentation quality. The results show that ABCNet achieves superior performance in accuracy of segmenting body tissues from body-torso-wide low-dose CT images compared to other state-of-the-art methods, reaching 92-98% in common accuracy metrics such as F1-score. ABCNet is also time-efficient and memory-efficient. It costs about 18 hours to train and an average of 12 seconds to segment four tissue components from a body-torso-wide CT image, on an ordinary desktop with a single ordinary GPU.

Conclusions:

Motivated by applications in body tissue composition quantification on large population groups, the goal of the disclosed techniques was to create an efficient and accurate body tissue segmentation method for use on body-torso-wide CT images. The proposed ABCNet achieves peak performance in both accuracy and efficiency that seems hard to improve any more. The experiments performed demonstrate that ABCNet can be run on an ordinary desktop with a single ordinary GPU, with practical times for both training and testing, and achieves superior accuracy compared to other state-of-the-art segmentation methods for the task of body tissue composition analysis from low-dose CT images.

1. INTRODUCTION 1.1 Background

Assessment of body tissue composition body-wide is important for various clinical and research applications[1]. It is widely accepted that body composition can independently influence health[2]. Bone, adipose tissue, and muscle occupy more than three-quarters of whole-body weight[3], which makes them particularly amenable to body composition analysis. For instance, the mass and distribution of adipose tissues can significantly influence the incidence of various cardiovascular and metabolic disorders and of various cancers[4], as well as the clinical outcome of patients with lung transplantation[5, 6]. Obesity is strongly associated with the risk of acute kidney injury in trauma[7] and obstructive sleep apnea syndrome[8]. Muscle mass has been shown to correlate with important clinical outcomes such as postoperative mortality, survival after chemotherapy, and non-ventilator status[9]. The quality of bone tissue is directly related to osteoporosis as well as to non-cancer death in men with prostate cancer[10]. Emerging research[11, 12] also shows that the same type of tissue but distributed in different anatomical locations, such as the subcutaneous adipose tissue (SAT) and visceral adipose tissue (VAT), may have different effects on health and in the setting of disease states, which make it necessary to analyze those tissues separately. Therefore, an accurate, efficient, practical, and production-mode method of segmentation and quantification of body tissue composition has potentially far-reaching consequences. Our work aims at finding such a method to quantify the four main tissues of interest, including adipose tissues (SAT and VAT separately), skeletal muscle tissue, and skeletal structures (including cortical bone, trabecular bone, and bone marrow) on body-torso-wide CT images.

1.2 Related Work

There have been many previously published approaches to quantify body tissue composition in various applications, as reviewed in references[2, 13-15]. Anthropometry, including body mass index (BMI), skinfold thickness, waist circumference, etc., is the easiest technique to perform and is widely used to assess obesity, as discussed in [13]. However, this kind of method does not provide information about the individual contributions of each tissue type to body composition. Bioelectrical impedance analysis (BIA) and air displacement plethysmography (ADP) are two other non-invasive methods with better accuracy than anthropometric methods. Although BIA has been considered as a simple and reliable method for assessment of body composition, as discussed in reference [14], its accuracy has been questioner[2, 15]. ADP has a strict requirement for the subject to fully exhale, which requires patient coaching and which may be difficult to achieve in children and in other patients who are unable to cooperate. Regardless of the degree of accuracy, none of the above methods permit regional body tissue quantification, such as quantification of the SAT and VAT components of adipose tissue.

Medical imaging techniques, including dual-energy X-ray absorptiometry (DXA), magnetic resonance imaging (MRI), and computed tomography (CT), make the in vivo imaging of anatomic organs and tissues possible. Assessment of body composition on these 2D or 3D images is more intuitive, flexible, and accurate compared to other non-invasive methods. DXA has been regarded as the reference standard for body composition analysis[16]. However, DXA is not useful for assessment of most clinical diagnoses. Therefore, if applied for body composition quantification, it requires additional radiation exposure[14, 38]. The accuracy of assessment based on DXA is also being questioned since it is difficult to evaluate 3D volume from a 2D projected image[17]. CT and MRI are routinely acquired in many clinical scenarios, and thus can be utilized opportunistically to quantify body composition with little-added healthcare cost. However, compared with CT, MRI is more expensive, slower in terms of image acquisition time, and is less widely available[17].

Moreover, the signal intensities of cortical bone and other connective tissues such as ligaments and tendons overlap on MRI and pose challenges for accurate segmentation, which makes it difficult to quantify bone tissues accurately. Therefore, to accurately assess SAT, VAT, skeletal muscle tissue, and skeletal structure tissue, CT is an ideal modality. Therefore, our work will focus on CT images, and in particular low-dose CT images. Different from the diagnostic CT technique, the low-dose CT technique utilized in PET/CT allows for a reduced radiation exposure, which facilitates whole-body CT imaging and makes this an attractive modality for performing direct whole body composition analysis.

Manual segmentation of tissues of interest on CT images by experienced readers is the commonly used method for quantifying body composition[6-8]. Unfortunately, it is labor-intensive, time-consuming, and prone to inter-reader variability, limiting its practical application for assessment of large numbers of data sets. Owing to these limitations, most existing reports of body composition assessment on CT use a single slice or a few slices to estimate the whole mass or volume of tissues of interest[18-22]. These methods assume a strong correlation and predictive ability between tissue properties in the selected slices and the whole body. As such, they are prone to inaccuracy since they assume that all subjects have a uniform and same body composition distribution. These assumptions are tenuous and cannot be guaranteed to be valid in most applications. Furthermore, the optimal selection of slices of interest to be assessed for particular tissues of interest is still controversial[23]. Additionally, even when the correlation is strong, it does not imply high accuracy of predicting tissue composition in the whole body. Popuri et al.[24] proposed a finite element method to automatically recognize the region of interest (ROI) in CT images. This algorithm cannot separately quantify SAT and VAT in abdominal and thoracic regions. Irmakci et al.[25] proposed a segmentation framework based on fuzzy connectivity utilizing three different MRI contrasts, separately. Although this method is fully automated and data-driven, the SAT and VAT components cannot be separated and skeletal muscle cannot be extracted.

As compared to 2D and interactive methods, automated 3D methods have been reported recently[26, 27]. Kim et al.[26] used the Convex Hull algorithm and a coordinate correction strategy to detect closed paths strictly surrounding muscle and bone. Although the accuracy reported of this method is relatively high, it is still assessed on a single 2D slice in each CT image. Hussein et al.[27] proposed an unsupervised method to segment SAT and VAT from CT images based on appearance and geometric information. The methodology reported in this reference is the state-of-the-art; however it focused on segmentation of only adipose tissues in the abdominal region, where other tissue types and other body regions were not assessed.

Recent advances in deep learning, in particular, convolutional neural networks (CNN), have shown dominant performance in the medical image analysis field. U-Net[28] brought the residual Encode-Decode technique, which was first presented by Fully Convolutional Network (FCN)[29] for the purpose of semantic image segmentation, into medical image segmentation and added shortcut connections between the corresponding down-sampling and up-sampling layers. Those connections can help to transform feature information and gradients in multiple paths, during forward and backward propagations. There are some emerging studies employing U-Net[30-32] and FCN[33] for body composition tissue segmentation in CT and MR images. However, those networks still maintain 2D segmentation on slices, which makes directly applying them for capturing 3D spatial information difficult. As discussed in reference [30], 3D analysis of body composition is more accurate than 2D approximations. Besides the above methods, there have been a number of CNNs that were initially designed for segmenting medical images, which have an objective similar to body tissue composition assessment and can be potentially directly applied to this task[34-37] But these networks have the disadvantages of heavy computational cost or high model complexity and their utility on body tissue composition analysis needs to be demonstrated.

1.3 Contributions

With the goal of addressing the above technical gaps, the present disclosure provides a practical residual Encode-Decode network, named ABCNet, for body composition quantification on body-torso-wide low-dose CT images. ABCNet denotes "A Body Composition Network." The expression "ABC" also connotes "basic" to reflect our belief that, for parcellation of other types of tissues in a different body region (within the calvarium, for example) or within a single anatomic object ("bone", for example, comprising or consisting of cortical bone, trabecular bone, and bone marrow), such an approach can be utilized. The disclosure provides at least the following advantages over conventional techniques: (i) This network is basically built on a basic convolutional unit named BasicConv as well as its variations. One particular type of BasicConv with kernel size of $1^3$, called Bottleneck, is frequently employed to compress parameters; a special Dense Block, which contains multiple Dense Layers with feature map linearly increased, is utilized to make the network deeper; and an efficient memory technique is used to further decrease the storage requirement. These designs provide for an ABCNet with a very deep network with relatively a small number of parameters. (ii) The strategy of dynamic soft Dice loss may be applied to optimize the network, requiring two steps of adjustment where coarse-to-fine tuning helps to improve the segmentation accuracy. (iii) ABCNet is the first 3D CNN designed to automatically and practically perform body composition analysis. In summary, the above innovations have led to a segmentation algorithm that is accurate, robust, and very efficient in terms of both time and memory, as we demonstrate in this paper.

2. MATERIALS AND METHODS

Adipose tissues (SAT and VAT separately), skeletal muscles, and skeletal structures, especially body-wide, are different from typical organs as 3D objects in that they have much larger volumes, more complex shapes (such as VAT which is amorphous), and much larger spatial extents. In our earlier work[38], we used precise definitions of the craniocaudal extent of the body torso and the different body regions, namely thorax, abdomen, and pelvis and the SAT, VAT, skeletal muscle, and skeletal structure regions in each of them. Without such definitions, the quantification of SAT and VAT and other tissues in a standardized manner will not be possible and comparison among different methods becomes meaningless. We employ the same definitions and abbreviations in this paper as illustrated in Table 1.

TABLE 1

Definitions of body regions and tissue regions (objects) in the body torso.

| Abbreviation | Definition |
| --- | --- |
| Thx | Thoracic region extending from 5 mm inferior to the bases of the lungs to 15 mm superior to the lung apices. |
| Abd | Abdominal region extending from the point of bifurcation of the abdominal aorta into common iliac arteries to the superior aspect of the liver. |
| Plv | Pelvic region extending from the inferior aspect of the ischial tuberosities to the point of bifurcation of the abdominal aorta into common iliac arteries. |
| BT | Body torso extending from the inferior aspect of the pelvic region to the superior aspect of the thoracic region. |
| Msl | All skeletal musculature in the body torso region. |
| Sk | All skeletal structures in the body torso region. |
| SAT | Subcutaneous adipose tissue in the body torso region. |
| VAT | Visceral adipose tissue (internal to Msl) in the body torso region. |

FIG. 1 illustrates some sample low-dose axial CT slices from three different (Plv, Abd, and Thx) levels in the body torso of a subject with color overlays that depict manual segmentations of the four tissues of interest. It can be seen that different tissue types and organs appear very similar and are tightly packed within the body region. More importantly, some of them have similar or even the same intensity values. For instance, SAT and VAT are normally very similar to each other in terms of attenuation values on CT. Msl and other solid organs (such as the liver and spleen shown in the middle image in the upper row of FIG. 1) have fairly similar soft tissue attenuation values on CT. As such, these challenges for segmentation of the four tissues of interest cannot be overcome through simply utilizing intensity or texture information. The information from localization and context also needs to be utilized.

FIG. 1 shows from left to right sample axial slices selected from the Plv, Abd, and Thx aspects of the body torso in one subject. Both original low-dose CT images (upper row) and manually delineated masks of the four tissue regions of interest (lower row) are shown (where blue=SAT; red=VAT; green=Msl; orange=Sk).

The residual Encode-Decode type of CNN has been proven to be effective in medical image segmentation[29, 36, 39]. Its success ensues largely from the wide receptive field of the down-sampled feature maps. Our new network is inspired by those previous studies[29, 36, 39] but with practical improvements. ABCNet can achieve a very deep structure, a large receptive field, and therefore an accurate segmentation performance even for these objects of very complex shape and confounding appearance, but with a relatively low number of parameters. In this network, Bottleneck and feature map re-computing techniques are widely utilized.

Figure 2:
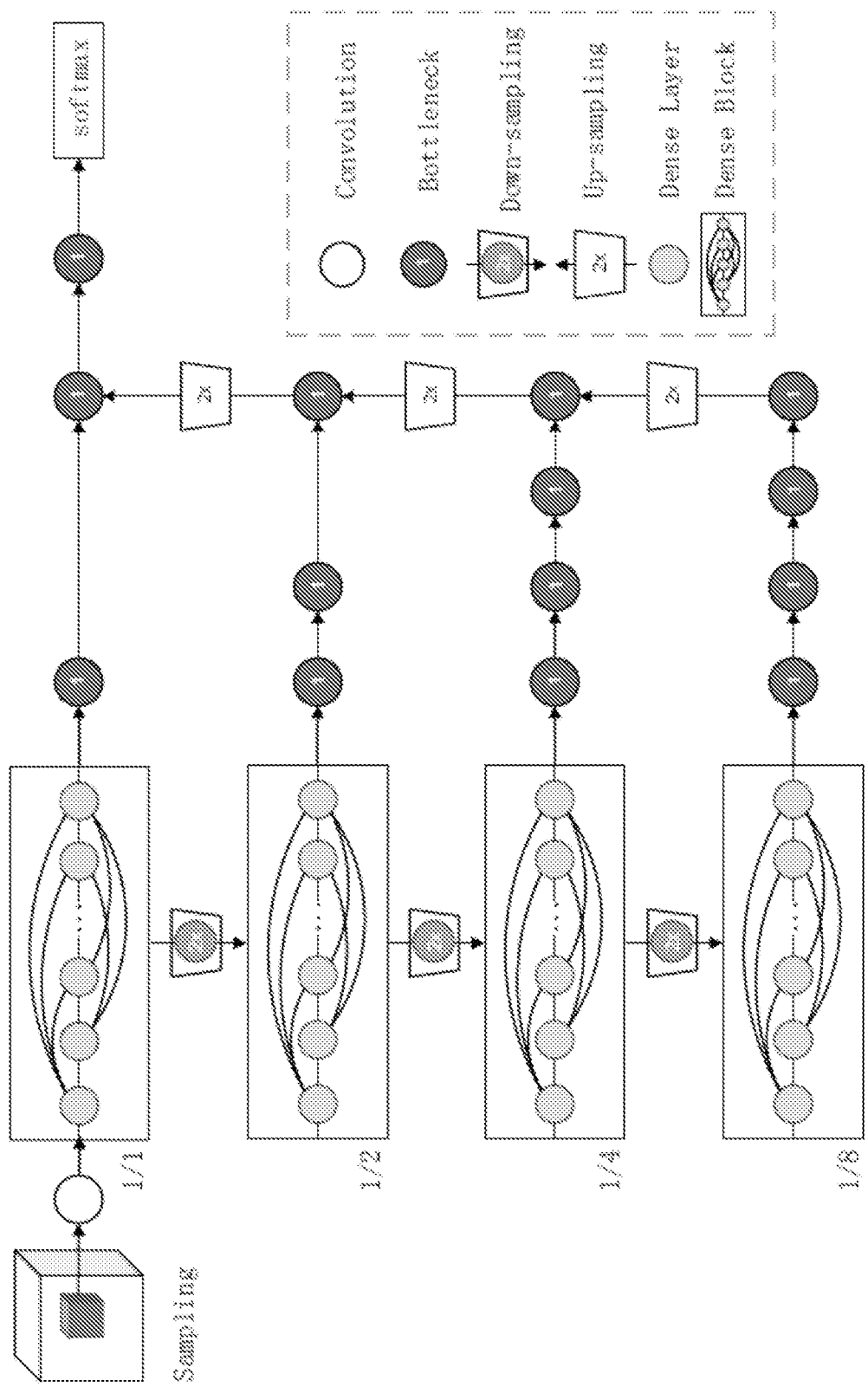
FIG. 2 shows an example architecture of an example neural network using the disclosed techniques.

The architecture of ABCNet is shown in FIG. 2. It comprises mainly five types of components, including normal convolution, Bottleneck, Dense Block, down-sampling, and up-sampling. Down-sampling is utilized to create lower resolution layers of feature maps, and up-sampling is used for recovering all feature maps into the original resolution. At each resolution level of the feature map, the Dense Block (e.g., which is composed of Dense Layers) is employed to extract deep features. Bottlenecks are frequently used since they can compress the feature maps and the parameters. After each up-sampling, Bottlenecks are also employed to fuse the feature maps from different resolution levels. Subsequently, the softmax classifier is employed to make the final decision. The details of ABCNet and its implementation are described in the following sections.

FIG. 2 shows example architecture of ABCNet.

2.1. Basic Convolution Block

Figure 3:
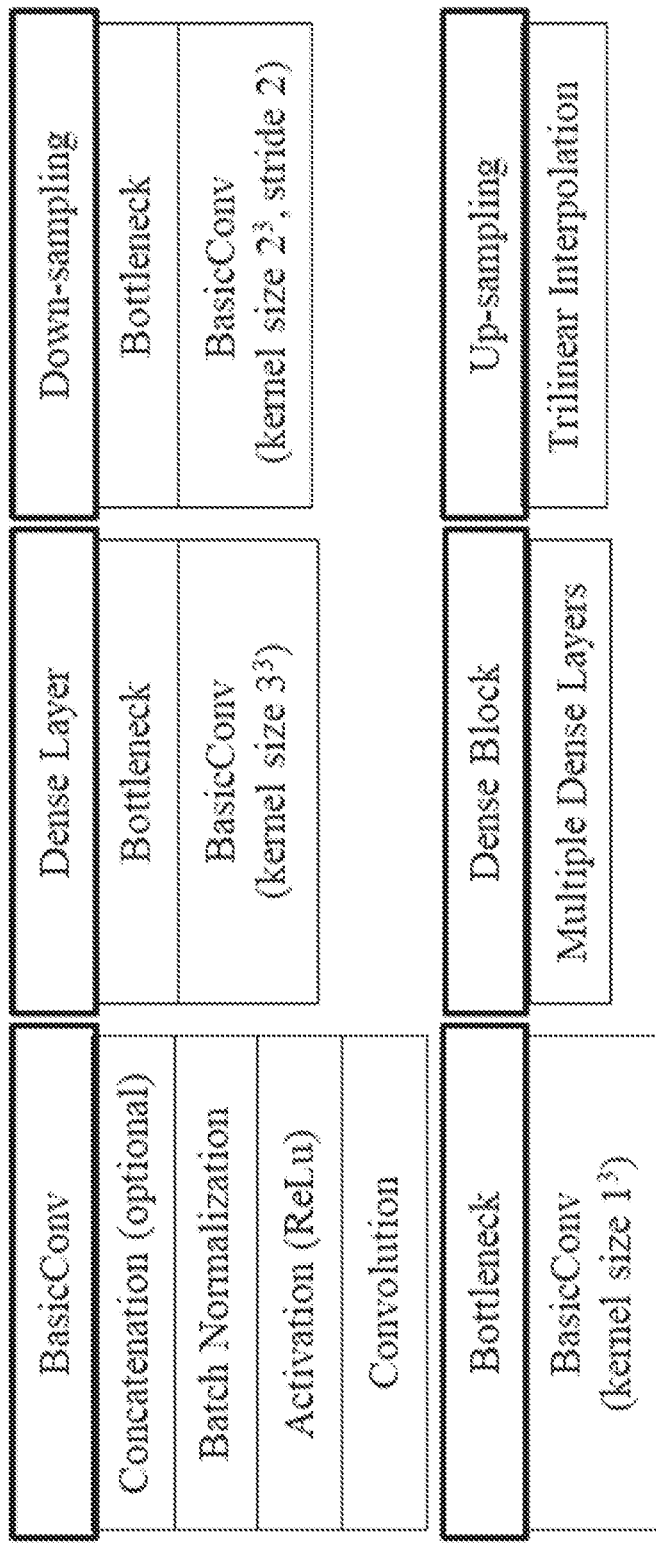
FIG. 3 shows example components of a convolutional block of an example neural network.

FIG. 3 shows five components in ABCNet.

ABCNet is built on a basic convolution block, named BasicConv. Except for the first convolutional layer at the beginning of this network and the up-sampling, all other components of ABCNet are derivatives of the BasicConv. As shown in FIG. 3, those components in FIG. 2 are formed from the BasicConv with different kernel sizes or from the concatenation of derivatives of it. The BasicConv comprises or consists of 4 modules, including optional concatenation, batch normalization, activation, and convolution, in sequence. The structure of BasicConv is shown in FIG. 3. Although convolution is the key operation in ABCNet, other assistant modules are also indispensable. Concatenation is the first operation in each BasicConv since the input feature maps are likely obtained from multiple previous BasicConv operations such as the Bottlenecks after each up-sampling and the Dense Layers in Dense Blocks, as can be observed from the multiple connections in FIG. 2. Yet, it is not always necessary to have all layers, which makes concatenation an optional operation in BasicConv. Batch normalization can avoid the vanishing gradient and exploding gradient issues

[40], which make this operation necessary for BasicConv. It should be noted that both batch normalization and activation are performed before convolution. We apply pre-activation instead of post-activation, which has previously shown a superior ability to improve the performance of networks[41, 42]. The employed activation function is ReLU[43]. Then, a conventional convolution layer with padding is utilized to obtain the deeper feature maps with the same size as the inputs.

2.2. Bottleneck

Regular convolution has the drawback of a large number of parameters. Especially for 3D image processing, the number of parameters will increase dramatically when the size of the convolution kernel becomes large. Hence, with only BasicConv, the network will become very complex while it gets deep. The popularly utilized Bottleneck, which is a convolution with the kernel size of 1×1, can reduce the dimensionality of feature maps[44, 45]. Recently, it has been reported to help CNNs to become increasingly deeper[46]. This convolution may be employed in ABCNet to compress the network, except that it is a derivative of BasicConv with a kernel of $1^3$, as seen from FIG. 3. Because of the relatively complex structure, Bottleneck in ABCNet has more powerful and wider usages. It can not only reduce the number of parameters of the network, but also fuse the feature maps which come from different pathways. Combined with the advantages from batch normalization and pre-activation, this Bottleneck fusion is comparable to normal size convolution. This point will be further discussed in the experimental and discussion sections. With these advantages, Bottlenecks are widely utilized in ABCNet, including embedding in the Dense Layer and down-sampling, as well as independently, as seen from FIG. 2.

2.3. Dense Layer and Dense Block

The Dense Block idea was put forward by Huang et al. in DenseNet[39], which is applied to alleviate the vanishing gradient problem. In a Dense Block, the prior layer connects with each of the following layers. This architecture can strengthen feature propagation and encourage feature reuse. Gibson et al.[36] utilized Dense Block in their Dense V-Net for medical image segmentation. Since the medical tomographic images are 3D, the feature maps, as well as convolution kernels, are usually much larger than in networks for 2D imagery. Thus, directly utilizing the Dense Block of Dense V-Net will pose computational and memory challenges.

Figure 4:
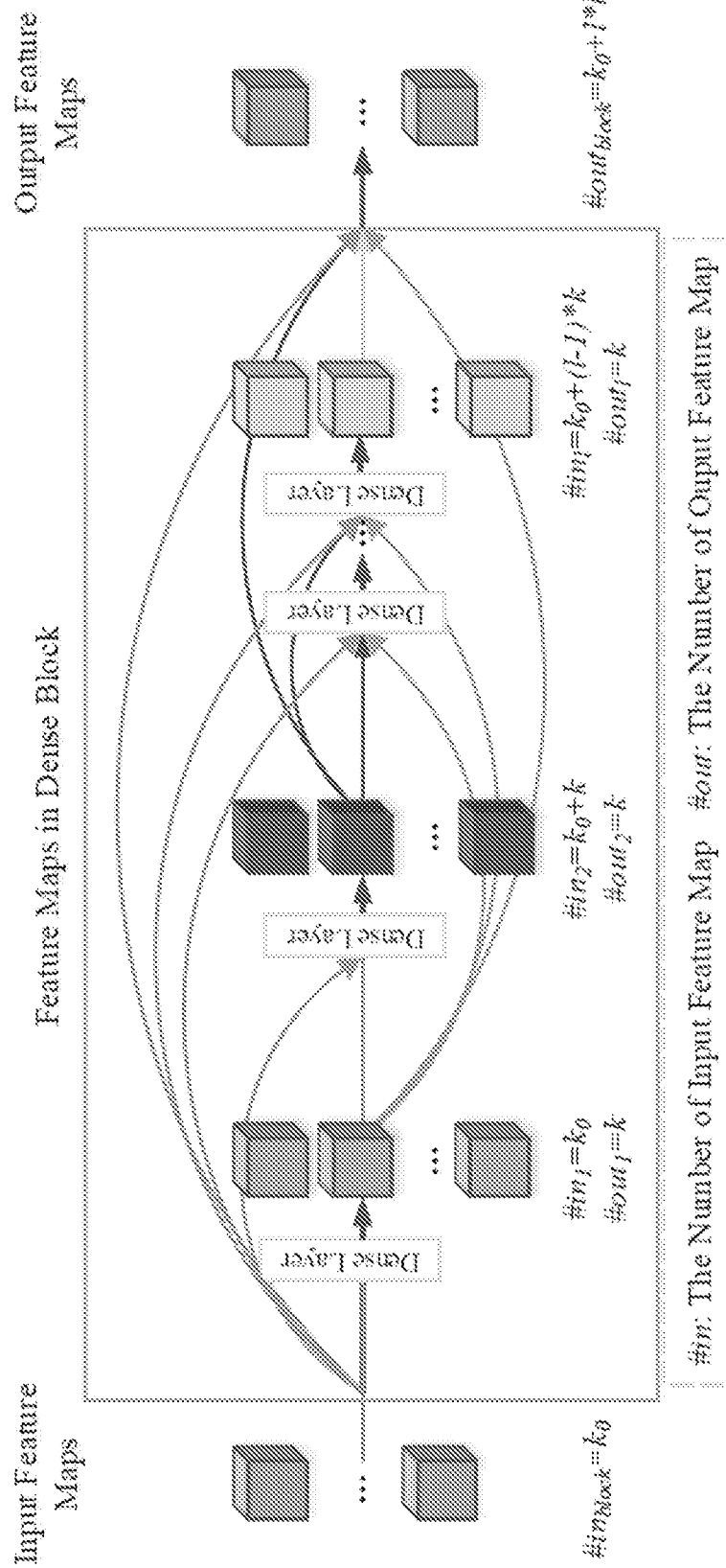
FIG. 4 shows an example dense block of an example neural network.

In ABCNet, a special component is provided to form Dense Block, which is named Dense Layer. As shown in FIG. 2, the proposed Dense Layer comprises or consists of a Bottleneck followed by a BasicConv with a kernel size of $3^3$. Bottleneck is employed to compress the parameters and reduce feature maps (FIG. 4). It concatenates the feature maps from previous layers, reduces the number of feature maps, and then inputs them into subsequent BasicConv. Bottleneck is a important step since both parameters and feature maps can be compressed in the Dense Layer, which improves efficiency and memory requirements. The union structure of Dense Layer allows the Dense Block to contain more Dense Layers and thus makes the network go deeper. Different from previous strategies for going deeper[36, 45], the Bottlenecks in ABCNet contain normalization and activation operations as well, which makes them no longer just simple compress tools, but also feature extraction layers. As demonstrated in the experiments below, the feature extraction capability of Bottlenecks is comparable to that of BasicConvs with normal size convolution. Furthermore, this character makes Bottleneck an independent convolutional layer in ABCnet.

FIG. 4 shows example architecture of Dense Block.

As an example, assume that $k_0$ feature maps will input into a Dense Block and that each layer will output k feature maps, where k is known as the growth rate of this Dense Block. Thus, for the $l_{th}$ layer in a Dense Block, $k_0+k\times(l-1)$ feature maps will be input. If only normal convolution is applied in each layer, such as the $3^3$ convolution[36], then $[k_0+k\times(l-1)]\times k\times 3^3$ convolutional parameters can be used in this layer. However, when Bottleneck is used, assuming $k_{bn}$ feature maps are being output from the Bottleneck, one can use $[k_0+k\times(l-1)]\times k_{bn}+k_{bn}\times k\times 3^3$ or $k_{bn}\times[k_0+k\times(l-1)+k\times 3^3]$ convolutional parameters. Obviously, Bottlenecks can significantly reduce the number of parameters, especially when Dense Blocks get deeper.

2.4. Down-Sampling and Up-Sampling

Similar to other FCN methods, ABCNet also has down-sampling to capture features at different levels of feature resolution, followed by up-sampling to recover those down-sampled feature maps into the initial resolution. Down-sampling comprises or consists of a Bottleneck followed by a BasicConv with a kernel size of $2^3$ and a stride of 2. Similar to the Dense Layer, the Bottleneck is applied to concatenate feature maps obtained from the upper resolution level and to compress the parameters. Different from the often-used pooling operations, convolution with a stride of 2 may be employed to down-sample the feature maps. For up-sampling, the untrained trilinear interpolation may be applied (e.g., which can further reduce the number of parameters). This free-of-training technique has been reported as an alternative up-sampling method and has been used in previous studies[29, 36]. Benefiting from down-sampling, ABCNet extracts extensive features from various resolution levels. Benefiting from up-sampling, ABCNet can achieve accurate segmentation at the voxel level. The components of down-sampling and up-sampling are illustrated in FIG. 3.

2.5. Dynamic Soft Dice Loss

Recently, Dice-Coefficient-based loss functions have become popular in medical image segmentation[35, 36, 47]. A probabilistic Dice-based loss function may be used for multi-class segmentation, named Soft Dice Loss (SDL). For C classes in the segmentation problem, the Softmax layer will output C probability maps which have the same size as that of the input patch/image. Assume the input patch/image contains N voxels. Let $p_n^c \in [0,1]$ denote the output probability of the $n^{th}$ voxel belonging to class c and $g_n^c \in \{0,1\}$ denote whether or not the $n^{th}$ voxel belongs to class c in ground truth labels. Then, the SDL is defined as $$SDL = 1 - \frac{1}{C}\left[\sum_{c=1}^{C}\frac{\left[2\sum_{n=1}^{N}p_n^c \times g_n^c\right]+\varepsilon}{\left[\sum_{n=1}^{N}p_n^c + \sum_{n=1}^{N}g_n^c\right]+\varepsilon}\right], \quad (1)$$

where ε is a small constant to avoid the numerical issue of dividing by 0. Essentially, SDL is equivalent to 1 minus the mean of the probabilistically-evaluated Dice similarity coefficients over all segmented classes.

In ABCNet, a dynamic SDL strategy may be applied for coarse training and fine tuning of the network. For the first several epochs, the background may be considered as an additional object class, which, in our case of 4 tissue types, implies C=5. When the model becomes relatively steady, the background will cease to be counted as an object, which means C will be treated as 4 then on. This strategy is employed to prevent the network from going toward an undesirable state of getting trapped at a local optimum at the beginning and to assist the network to approach the optimal model in the end. If the background (including air and other uninteresting tissues) is not included at the beginning of training, then it becomes easy for the network to seek an undesirable state where all four tissues of interest are over segmented (resulting in high false positive rates). This occurs because of the inherent bias in the Dice metric, which favors over-segmentation over under-segmentation due to its known higher sensitivity to false negatives than false positives[48]. Therefore, the SDL may be computed based on all five objects to roughly train the network, and then the background in the SDL may be excluded for refined training. In our implementation, the number of objects may be changed while SDL is lower than 0.2 (or when mean of all Dice values is >0.8). This threshold is set based on our observation that the Dice values for one or more classes will tend to 0 when the network is trapped at a local optimum. Therefore, SDL<0.2 can ensure that for none of the 5 classes Dice is 0.

2.6. Implementation

Because of the large size of CT images, it is difficult for typical FCN structures to be directly implemented. Thousands of feature maps may be generated during the forward and backward propagations, which creates challenges for both memory and computational complexity. Therefore, patch-wise training and efficient memory techniques may be applied in ABCNet. The learning rate is changed according to the cosine annealing method[49].

(1) Patch-Wise Training

Similar to V-Net (which uses patches of 128×128×64 voxels) and Dense V-Net (which uses patches of 72×72×72 voxels), patch-wise training may be applied with a patch size of 72×72×72 voxels (which equals the size of 8.64×8.64×28.8 cm$^3$ under the spatial resolution of our data set). Those patches may be randomly harvested from the training data set on-the-fly. There may be no ROI specified in the training stage, which means that all patches are randomly selected from the original CT images. Mini-batch gradient descent with a batch size of 4 is utilized to reduce the data bias effect in optimization. Similar to other residual Encode-Decode models, after training, ABCNet can achieve an end-to-end segmentation for much larger patches. The network is trained for 10,000 iterations (50 epochs), and the initial learning rate is 0.01, which is reduced by the cosine annealing strategy[49] for each epoch with a minimum learning rate of 0.00001.

(2) Memory Efficient Technique

The cost of the memory efficient technique is a little extra computational time in order to save significantly in memory storage[41]. The main idea of this technique is to drop some of the middle results during forward propagation and to recompute them while executing backward propagation. The selected intermediate results have to satisfy two conditions, namely, they are easy to compute but expensive storage-wise. In ABCNet, the concatenation and batch normalization operations are easy to compute but consume a lot of memory to keep the feature maps for the subsequent backward propagation. Thus, these two layers may be chosen for dropping middle results. Assume a Dense Block has a growth rate of k and has l Dense Layers in it. Without memory conservation, at least k×l×(l+1)/2 feature maps can be stored in a Dense Block. However, it has to store only k×l feature maps if this frugal technique is adopted. Through efficient use of memory in this manner, much larger patches may be handled to make the network much deeper, at the cost of a little additional computational time.

(3) Detailed Network Structure

The majority of an example architecture of ABCNet is already presented in FIG. 2. The only missing details are the structures of the Dense Blocks. As mentioned herein, localization (positional information) is very important in body tissue composition segmentation. The Dense Blocks of low-resolution feature maps are important to providing global locational information. Therefore, Dense Blocks at lower resolution should comprise deeper Dense Layers to extract deep features. Fortunately, this is easy to realize since the lower the feature map resolution, the smaller will be the feature map size, which consequently allows more layers and feature maps to be contained in the Dense Block. In our implementation, from top to bottom, four Dense Blocks contain 6, 12, 14, and 16 Dense Layers and have growth rates of 8, 12, 14, and 16, respectively. The Bottleneck components produce min(input, 4 k) feature maps to compress the network, where k is the growth rate in Dense Blocks. It means that if the input to Bottleneck is less than 4 k (the first several layers in a Dense Block) or the Bottleneck is independent, it will output as many as input feature maps; otherwise, the Bottleneck will compress the feature maps to 4 k. Table 2 demonstrates the detailed layout of ABCNet through defined components shown in FIG. 2.

TABLE 2

The structural details of ABCNet and its variations. DL denotes Dense Layer, BN denotes Bottleneck, BC(3$^3$) denotes BasicConv with kernel size 3$^3$, and Conv(3$^3$) and Conv(2$^3$) denote convolutional operation with kernel sizes of 3$^3$ and 2$^3$, respectively. k is the growth rate.

| Component | ABCNet | ABCNet-Lite | ABCNet-Rm-BN | ABCNet-Skip-BN |
|---|---|---|---|---|
| Convolution | | Conv(3$^3$) | | |
| Dense Block (1) | DL × 6, k = 8 | DL × 6, k = 5 | BC(3$^3$) × 6, k = 8 | DL × 6, k = 8 |
| Down-sampling (1) | | BN | | |
| | | Conv(2$^3$), St-ride = 2 | | |
| Dense Block (2) | DL × 12, k = 12 | DL × 8, k = 8 | BC(3$^3$) × 12, k = 12 | DL × 12, k = 12 |
| Down-sampling (2) | | BN | | |
| | | Conv(2$^3$), Stride = 2 | | |
| Dense Block (3) | DL × 14, k = 14 | DL × 10, k = 16 | BC(3$^3$) × 14, k = 14 | DL × 14, k = 14 |
| Down-sampling (3) | BN Conv(2$^3$), Stride = 2 | — | BN Conv(2$^3$), Stride = 2 | |
| Dense Block (4) | DL × 16, k = 16 | — | BC(3$^3$) × 16, k = 16 | DL × 16, k = 16 |
| Skip Bottleneck (4) | BN × 4 | — | BN × 4 | BC(3$^3$) × 4 |
| Up-sampling (4) | Interpolation BN | — | Interpolation BN | BC(3$^3$) |
| Skip Bottleneck (3) | | BN × 3 | | BC(3$^3$) × 3 |
| Up-sampling (3) | | Interpolation BN | | BC(3$^3$) |
| Skip Bottleneck (2) | | BN × 2 | | BC(3$^3$) × 2 |
| Up-sampling (2) | | Interpolation BN | | BC(3$^3$) |
| Skip Bottleneck (1) | | BN | | BC(3$^3$) |
| Final Convolution | | BN × 2 | | BC(3$^3$) × 2 |

3. EXPERIMENTS AND RESULTS

To demonstrate the superior performance of ABCNet for body composition analysis, several state-of-the-art medical image segmentation methods, including DeepMedic[34], V-Net[35] and Dense V-Net[36], are employed for comparison. Although those methods were not primarily developed for quantifying body composition, the similar application for segmentation makes them the most suitable comparison methods, since, to the best of our knowledge, there are few algorithms that can automatically segment all four tissue regions of interest from whole-body-wide low-dose CT images for assessment of body composition. Although Weston et al.[30] employed the U-Net structure to segment all four body composition tissues, only one slice at the level of the L3 vertebra was selected to quantitatively evaluate their method. As they reported in their article through qualitative analysis, the segmentation of the 3D image is more accurate than the 2D approximation for tissue quantification. Thus, we directly employ the 3D U-Net[37], which is known as the 3D expansion version of U-Net, as one of the compared methods.

All compared DL methods are tested through their publicly available implementations. For DeepMedic, the authors' version were used (e.g., see https://biomedia.doc.ic.ac.uk/software/deepmedic/). For the other three methods, their re-implements in Niftynet platform[50] was used (e.g., https://niftynet.io/), which are implemented based on their original presentation. Most of the parameters of these methods are at default setting according to the description in the papers, and we adjust only certain key parameters which may influence performance in our task. In Dense V-Net, the explicit spatial prior information is not applied since the four tissues are distributed body-wide, and the rough spatial prior information brings negative effect to the segmentation accuracy. In addition, the loss function is not utilized as well as the adjustment strategy presented in Dense V-Net since the four tissues do not present extreme class imbalance. Instead, the Dice loss presented in V-Net was applied but extended to multiple classes, which was also considered in the study of Dense V-Net. In V-Net, the above loss function is also applied so that it can perform segmentation on multiple tissues. For fair comparison, the V-Net and Dense V-Net were iteratively trained with the same number of patches as utilized in ABCNet, e.g., 40000, which are balanced and selected on-the-fly from the training data set randomly. For 3D-UNet and DeepMedic, we use 80,000 and 120,000, respectively, to achieve optimal performance. In the experiments, all losses for these networks remain relatively stable under the above strategies.

Recently, there have been some studies focused on particular tissue type[27], or that have evaluated tissue mass based on specific slices[19], which are all reported as state-of-the-art algorithms in their domains. In the present disclosure, a quantitative comparison based on the performance reported in those studies is provided.

In addition, analysis of the performances of different variations of ABCNet is illustrated in Table 2. ABCNet-Lite is a simplified ABCNet with fewer Dense Blocks as well as fewer Dense Layers in the Dense Block. In ABCNet-Rm-BN, all of the Bottlenecks in Dense Blocks are removed, which will increase the number of parameters in the network. ABCNet-Skip-BN is the network where all Bottlenecks after Dense Blocks are replaced by BasicConv with a kernel size of $3^3$.

3.1. Data Sets, Evaluation Metrics, and Experiments

This retrospective study was conducted following approval from the Institutional Review Board at the Hospital of the University of Pennsylvania along with a Health Insurance Portability and Accountability Act waiver. The image data set included low-dose unenhanced CT images from 38 subjects who previously underwent $^{18}$F-2-fluoro-2-deoxy-D-glucose (FDG) PET/CT imaging without administration of intravenous contrast material on a 16-detector row LYSO PET/CT scanner with time-of-flight capabilities (Gemini TF, Philips Healthcare, Bothell, WA). The CT images had been acquired using a kVp of 120, an effective mAs of 50, a gantry rotation time of 0.5 msec, and a voxel size of 1.2×1.2×4 mm$^3$. The images were selected from our hospital patient image database by a board-certified radiologist (co-author Torigian). The patient cohort consists of 25 male and 13 female subjects in the age range 31-83 years and in the BMI range from 17.27 to 38.28 kg/m$^2$, and is composed of 31 minimally abnormal subjects and 7 cancer patients. Manual ground truth segmentations of the four tissue regions were generated via CAVASS software[52] by well-trained operators and verified by the above-mentioned radiologist. The segmentation methods utilized included iterative live wire[51], thresholding, and manual painting and correction.

In the experiments, the commonly-used evaluation metrics—precision, recall, and F1-score, were adopted to measure the segmentation quality. Precision is the fraction of segmented results that constitute true positives, while recall is the fraction of ground truth that represent true positives. F1-score is the harmonic mean of precision and recall and is equivalent to the other commonly used metric called Dice Coefficient. To compare with existing body composition quantification methods[19], mean percent prediction error (% PE) as used in that report, calculated as (|(ground truth−predicted)|/|predicted|)×100, where the variables represent sets and |•| denotes the number of voxels in the set, was also employed in our quantitative comparison.

A shuffle-split 5-fold cross-validation strategy was employed for evaluating ABCNet, as well as the comparison methods[34-37], on the data set. This means that the entire process, including training and testing, is repeated five times. In each experimental group, 18 and 5 CT images are randomly selected out of 38 CT images for training and validation, respectively. The remaining 15 CT images are used for testing. The results reported below are based on those 75 testing CT image sets.

3.2. Results

Figure 5:
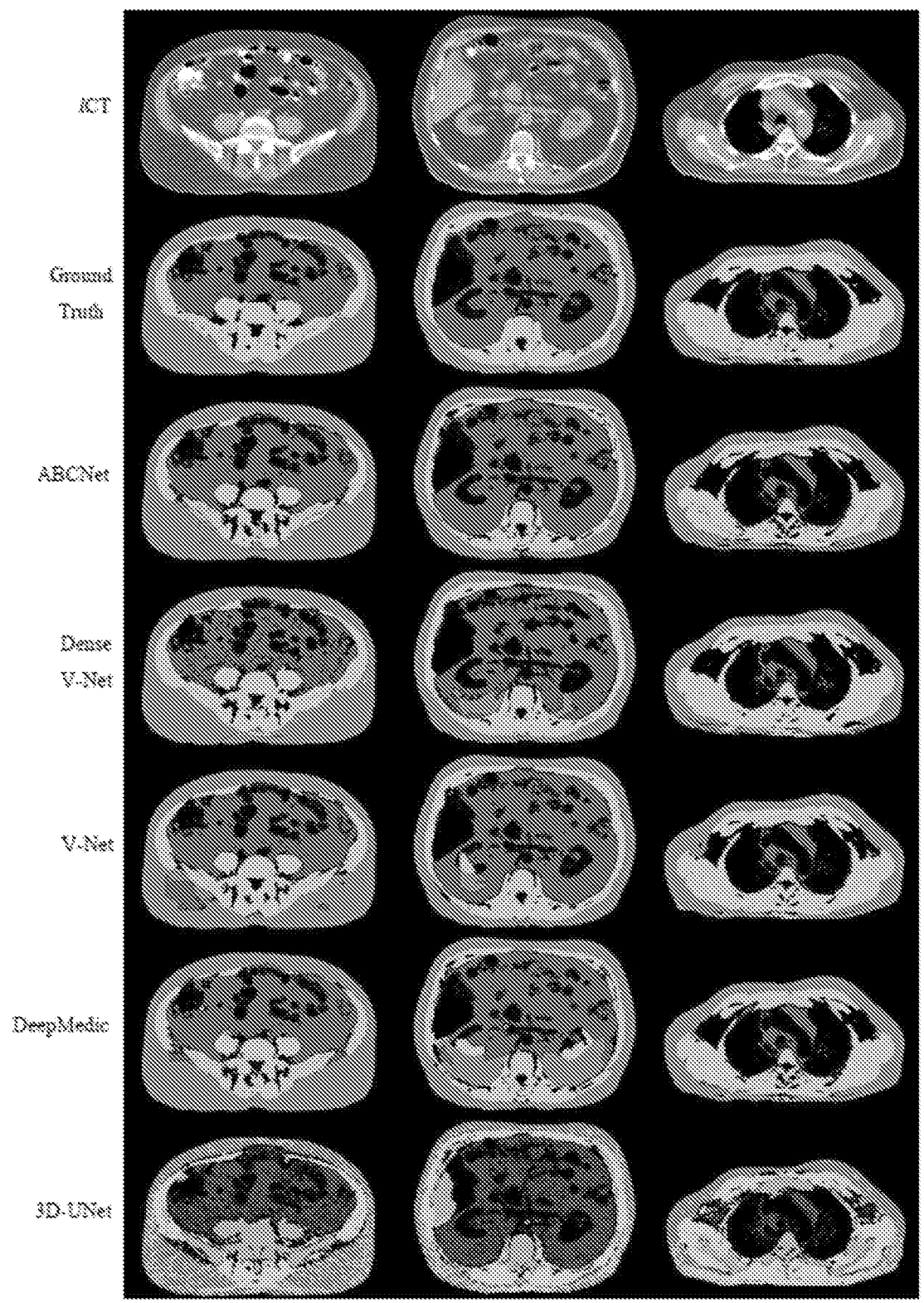
FIG. 5 shows ample slices from segmentation results for the compared methods.

Sample segmentation results for ABCNet and the other three methods, as well as manual ground truth segmentations, are illustrated in FIG. 5 for one test CT image. We note that it is impossible to create perfect ground truth due to, for example, the presence of micro-vascular and nerve structures within the adipose regions and similarly subtle intra-muscular fat within muscle regions. For creating ground truth, we first manually delineate certain major interfaces like the muscle wall or the interface between SAT and VAT regions, then apply thresholding within such defined regions to separate tissue components, and then make manual corrections as needed. Finally the ground truth so created is checked meticulously by our expert (Torigian) to make sure that no gross and manually correctable errors remain. We believe that this is the best currently possible way to create ground truth for these tissue components. Errors if any in ground truth at such microscopic level are impossible to decipher and correct manually.

The selected slices in FIG. 5 are from Plv (first row), Abd (second row), and Thx (third row) regions in the body. SAT (blue), VAT (red), Msl (green), and Sk (orange) are together shown in this figure. Quantitative evaluations of the segmentation results are summarized in Table 3. Under the same experimental strategy (shuffle-split 5-fold cross validation), the segmentation performance of ABCNet's variants is also evaluated and the results are summarized in Table 3. Box plots are shown in FIG. 6 to further compare the results of all methods for all four tissues.

TABLE 3

The mean (and standard deviation) of Precision, Recall and F1-score of four segmentation algorithms. Boldface denotes a statistically significant difference of the results from different algorithms compared to those of ABCNet ($p < 0.05$).

| Algorithm | SAT | VAT | Msl | Sk |
|---|---|---|---|---|
| | Precision | | | |
| ABCNet | 0.977 | 0.950 | 0.919 | 0.968 |
| | (0.018) | (0.045) | (0.066) | (0.025) |
| ABCNet-Lite | 0.977 | 0.948 | 0.917 | 0.964 |
| | (0.017) | (0.042) | (0.063) | (0.028) |
| ABCNet-Rm-BN | 0.980 | 0.955 | 0.923 | 0.970 |
| | (0.016) | (0.038) | (0.063) | (0.025) |
| ABCNet-Skip-BN | 0.973 | 0.947 | 0.921 | 0.971 |
| | (0.020) | (0.040) | (0.068) | (0.022) |
| DeepMedic | 0.956 | 0.873 | 0.896 | 0.907 |
| | (0.031) | (0.092) | (0.065) | (0.064) |
| V-Net | 0.965 | 0.926 | 0.890 | 0.927 |
| | (0.021) | (0.052) | (0.066) | (0.031) |
| Dense V-Net | 0.972 | 0.851 | 0.859 | 0.829 |
| | (0.020) | (0.081) | (0.078) | (0.039) |
| 3D-Unet | 0.990 | 0.946 | 0.884 | 0.941 |
| | (0.006) | (0.037) | (0.068) | (0.037) |
| | Recall | | | |
| ABCNet | 0.972 | 0.937 | 0.934 | 0.967 |
| | (0.033) | (0.035) | (0.056) | (0.027) |
| ABCNet-Lite | 0.968 | 0.914 | 0.936 | 0.969 |
| | (0.028) | (0.041) | (0.055) | (0.030) |
| ABCNet-Rm-BN | 0.968 | 0.918 | 0.937 | 0.967 |
| | (0.029) | (0.043) | (0.053) | (0.029) |
| ABCNet-Skip-BN | 0.978 | 0.943 | 0.937 | 0.968 |
| | (0.025) | (0.037) | (0.052) | (0.032) |
| DeepMedic | 0.968 | 0.907 | 0.920 | 0.961 |
| | (0.018) | (0.047) | (0.063) | (0.047) |
| V-Net | 0.963 | 0.929 | 0.902 | 0.934 |
| | (0.025) | (0.035) | (0.043) | (0.030) |
| Dense V-Net | 0.933 | 0.788 | 0.942 | 0.974 |
| | (0.030) | (0.063) | (0.030) | (0.013) |
| 3D-Unet | 0.910 | 0.747 | 0.959 | 0.979 |
| | (0.067) | (0.099) | (0.023) | (0.022) |
| | F1-score | | | |
| ABCNet | 0.974 | 0.942 | 0.924 | 0.967 |
| | (0.024) | (0.032) | (0.041) | (0.023) |
| ABCNet-Lite | 0.973 | 0.930 | 0.924 | 0.965 |
| | (0.020) | (0.036) | (0.037) | (0.026) |
| ABCNet-Rm-BN | 0.974 | 0.936 | 0.928 | 0.968 |
| | (0.021) | (0.034) | (0.038) | (0.024) |
| ABCNet-Skip-BN | 0.975 | 0.943 | 0.927 | 0.968 |
| | (0.020) | (0.032) | (0.043) | (0.024) |
| DeepMedic | 0.962 | 0.887 | 0.905 | 0.932 |
| | (0.021) | (0.065) | (0.047) | (0.051) |
| V-Net | 0.964 | 0.927 | 0.894 | 0.930 |
| | (0.020) | (0.037) | (0.036) | (0.028) |
| Dense V-Net | 0.952 | 0.818 | 0.896 | 0.895 |
| | (0.025) | (0.070) | (0.046) | (0.027) |
| 3D-Unet | 0.947 | 0.832 | 0.918 | 0.959 |
| | (0.040) | (0.076) | (0.041) | (0.026) |

FIG. 5 show sample slices from segmentation results for the compared methods. Blue: SAT, Red: VAT, Green: Msl, Orange: Sk.

Figure 6A:
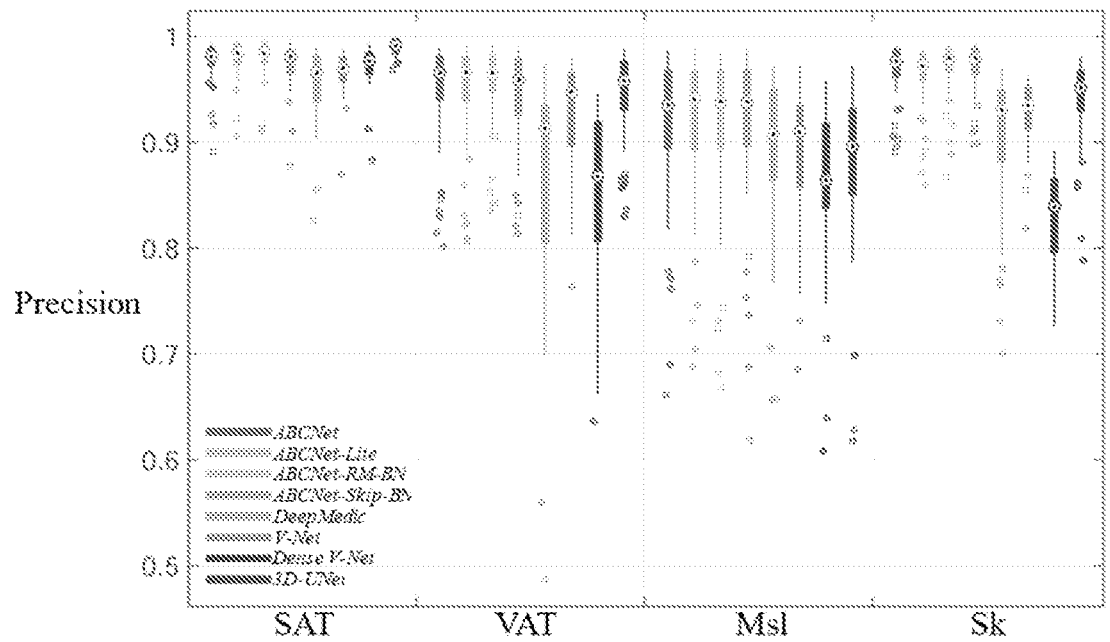
FIG. 6A shows a box plot of precision to compare the results of all methods for all four tissues.
Figure 6B:
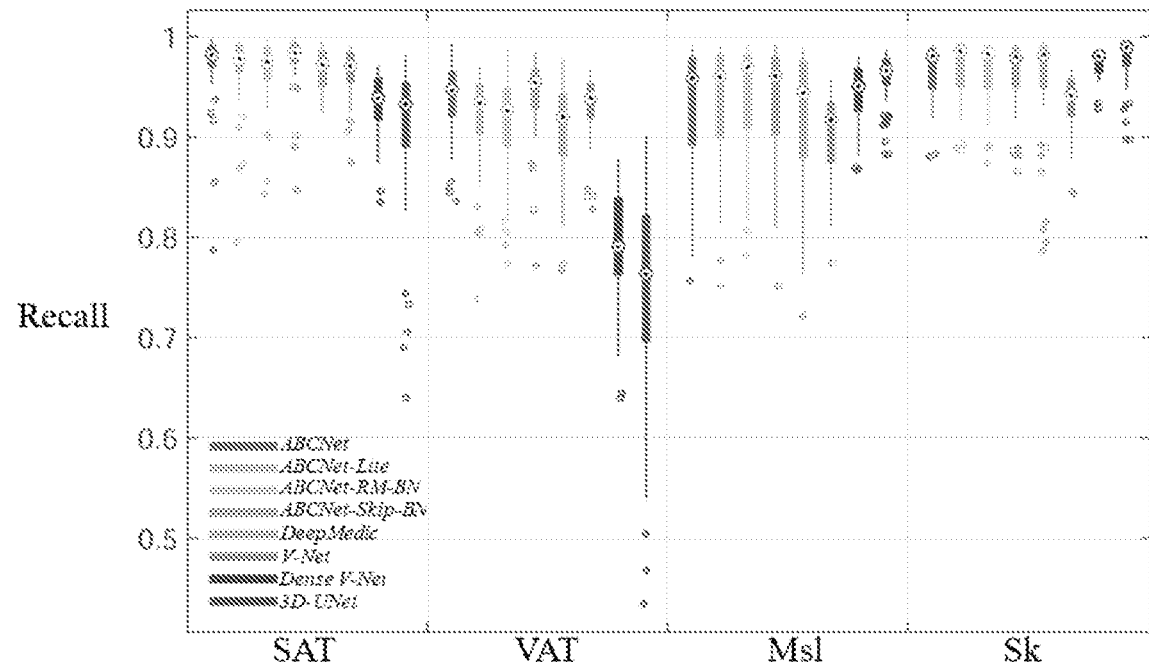
FIG. 6B shows a box plot of recall to compare the results of all methods for all four tissues.
Figure 6C:
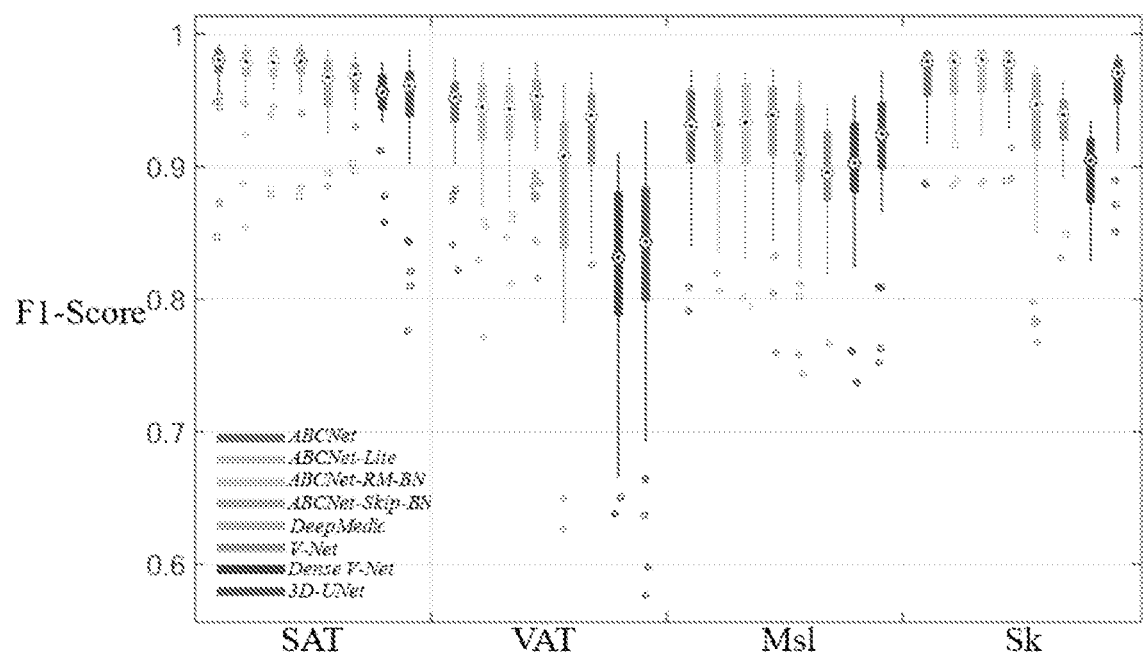
FIG. 6C shows a box plot of F1-scores to compare the results of all methods for all four tissues.

FIGS. 6A-C show box plots of the metrics for the results of comparison summarized in Table 3. The lower and upper edges of the boxes represent $25^{th}$ and $75^{th}$ percentiles, respectively. The median value is marked by a solid circle in the box. The hollow circle represents outliers beyond the 1.5 inter-quartile range. For each of the plots the values in the key from top to bottom are shown from left to right (e.g., ABCNet is shown as the far left in each quadrant, followed by ABCNET-lite and so forth).

It is difficult for us to reproduce the previous methods which estimate tissue mass based on a particular slice(s)[19] since we do not have the precise mass information of body composition for our data set. Hence, we assume that all tissues are uniformly distributed in each voxel, and therefore that the tissue mass estimation is equivalent to the voxel amount estimation. Based on this assumption, % PEs of segmentation results of adipose tissues achieved by ABCNet and that reported in a previous study[19] are summarized in Table 4. Furthermore, the means of F1-scores of SAT and VAT for ABCNet and Hussein et al.'s method[27] are also illustrated in this table.

TABLE 4 shows mean percent prediction errors (% PE) and mean of F1-scores of adipose tissue segmentation results for ABCNet and other comparable methods.

| Algorithm | SAT | VAT | Adipose Tissues |
|---|---|---|---|
| | % PE | | |
| ABCNet | 0.015-9.61 | 0.007-16.78 | 0.017-14.28 |
| | (mean = 1.8) | (mean = 5.1) | (mean = 2.4) |
| Estimate based on Particular Slices[19] | Not reported | Not reported | 8.77-24.06 |
| | Mean of F1-score | | |
| ABCNet | 0.974 | 0.942 | 0.968 |
| Hussein et al.'s method[27] | 0.943 | 0.919 | Not reported |

4. DISCUSSION

From the sample display in FIG. 5, we may observe that, compared to other methods, there are distinct advantages of ABCNet. One advantage is the ability to retain detailed information, which can be observed from the small holes and gaps within the Msl and adipose tissues. Those details are accurately segmented, which we believe should be attributed to the high-resolution Dense Block. With direct convolution on the original CT images, all Dense Layers in the first Dense Block can receive the initial information, which makes ABCNet accurately extract those details. We can see in FIG. 5 that some small gaps are falsely labeled in the ground truth within Msl tissue, but are precisely delineated by ABCNet. Those small gaps are very hard to be accurately labeled manually because of the partial volume effect. However, ABCNet seems to correct this problem at some level. These observations demonstrate the ability of ABCNet in keeping details. Another advantage is that the location information can be fully taken into consideration, which can be particularly observed from the results of SAT and VAT. In the state-of-the-art methods shown in FIG. 5, some large areas in SAT and VAT are falsely delineated. Similar situations also occur in the Msl results of V-Net. This type of false positive segmentation on large areas rarely occurs with ABCNet. This observation should be attributed to the lower resolution Dense Blocks. Although in the other three compared networks the lower resolution information is also applied, none of them achieves such deep structure as that of ABCNet while keeping the network practically manageable. The particular designed components Basic-Conv, Bottleneck, and Dense Blocks facilitate ABCNet to embody very deep layers in the lower resolution Dense Blocks. This helps ABCNet to capture global features as well as location information.

The quantitative evaluations in Table 3 also demonstrate the superior performance of ABCNet. We can see that for all four tissues of interest, all three evaluation metrics are above 0.91. In particular, for SAT, all three assessments are around 0.97. The results for Sk also are excellent with all three metrics exhibiting values above 0.96. The results for the other two tissues achieve relatively less accuracy, where VAT achieves an F1-score (Dice) of 0.94 and Msl tissue achieves an F1-score of 0.92 although still excellent considering that they are very challenging regions to segment given that they are sparsely distributed within the body, have very complex shapes, and we are dealing with low-dose (and resolution) CT images compared to diagnostic quality images.

Statistically significantly improved performance of ABCNet over other state-of-the-art methods can be seen in Table 3. ABCNet achieves statistically significant superior results for all F1-scores. For the other two evaluation components, except the recall of Sk, ABCNet achieves the best or one of the best performance measures. Compared with other specific body composition quantification methods, as shown in Table 4, ABCNet also achieves superior accuracy. As discussed in the previous studies[19], the accuracy of the evaluation of adipose tissue based on particular slices was with a % PE range from 8.77 to 24.06. In ABCNet, this error for SAT and VAT achieves a mean of 1.8 and 5.1, respectively. Compare with the method designed expressly for quantifying SAT and VAT[27], our network can obtain more accurate results along with accurately quantifying other two important tissue components of interest. Overall, ABCNet seems to be more accurate and able to handle other and more challenging body composition tissues encountered on CT images throughout the body.

Our previous method AAR-BCA[38] used a model-based strategy to model certain anatomic (some artificial and others natural) objects which best facilitated the delineation of all four component tissues. That method was very accurate in localizing objects but it had deficiencies in precise delineation, particularly of the VAT region. The F1 scores for SAT, VAT, Msl, and Sk were in the range 0.87-0.97, 0.56-0.91, 0.72-0.94, and 0.78-0.97, respectively. In the current paper, we embed the previous idea of global recognition or localization of anatomy into the design of ABCNet through a multiscale and multiresolution approach for encoding and decoding features without compromising its detailed delineation capability and thereby obtain substantially improved accuracy.

Table 3 also shows the assessments of the variants of ABCNet. From the F1-scores, we can see that ABCNet and its varieties basically have the same levels of accuracy. Through those evaluation values, ABCNet appears to have slightly better performance than ABCNet-Lite and ABCNet-Rm-BN but inferior accuracy compared to ABCNet-Skip-BN. Compared with ABCNet-Lite, the superior accuracy of ABCNet for VAT segmentation is statistically significant although not substantial. We believe that the deeper network of ABCNet has more ability to extract more details of such sparse objects. Although ABCNet-Skip-BN has slightly better segmentation results but are not statistically significant, it contains many more parameters in its network (Table 2), which makes it much more complex in terms of both computation and storage space.

Besides having high accuracy, ABCNet is also time-efficient and memory-efficient. The above described experiments were run on a modern desktop computer with the following specifications: 4-core Intel Xeon 3.3 GHz base CPU with 8 GB RAM and an NVIDIA-GTX-1080 GPU, running on the Linux operating system. The training time of ABCNet (for one fold) is about 18 hours, and it costs an average of 12 seconds to process a body-torso-wide CT image and output the four tissue components.

ABCNet has a depth of 118 layers but only 1.36 million (M) parameters. The complexity of the network is comparable to those of DeepMedic (12 layers with 0.6M parameters) and Dense V-Net (35 layers with 0.9M), and much lower than that of V-Net (34 layers with about 71M parameters) and 3D U-Net (31 layers with 19M parameters). In Table 5, we provide other information about ABCNet and its variants, including network depth, number of parameters, and segmentation time. It is worth noting that although ABCNet-Lite has fewer parameters than DeepMedic and Dense V-Net, it still has a superior performance, which can be seen from Table 3. We believe this superiority owes to the particular component—Dense Layer, which allows ABCNet to become deeper, therefore perform better, but with relatively lightweight structure.

TABLE 5 shows network characteristics of ABCNet and its varieties.

| Algorithm | Depth | Number of Parameters (million) | Segmenting Time (seconds/subject) |
| --- | --- | --- | --- |
| ABCNet | 118 | 1.36 | 11.6 |
| ABCNet-Lite | 61 | 0.44 | 8.1 |
| ABCNet-Rm-BN | 70 | 2.27 | 11.8 |
| ABCNet-Skip-BN | 118 | 3.35 | 17.8 |

In summary, ABCNet is able to segment all major body composition tissues from CT images more accurately compared to other state-of-the-art methods. It is also a time-efficient and memory-efficient network which can be run on a normal desktop with a single ordinary GPU. It costs only a couple of hours to train the network and takes only a few seconds to segment a body-torso-wide CT image. It is a practical method that can be applied for body tissue composition quantification routinely on large groups of image data sets.

5. CONCLUSIONS

Motivated by applications in body tissue composition quantification on large population groups, the goal of the disclosed techniques was to create an efficient and accurate body tissue segmentation method for use on body-torso-wide CT images. A new neural network (e.g., residual Encode-Decode based neural network), named ABCNet, was described herein. ABCNet may be mainly formed by a particular processing unit called BasicConv which comprises or consists of concatenation, batch normalization, activation, and convolution. Bottleneck, which is one particular type of BasicConv, is widely used in ABCNet to achieve fusion of feature maps, parameter compression, and extraction of deeper features. In each resolution level of the feature map, the Dense Block may be used to extract deeper features. With the linear growth in the number of feature maps, the number of parameters and the feature map size may be efficiently controlled in Dense Blocks and therefore in all networks. A recomputing strategy may be employed to reduce the memory storage requirement.

With this approach, ABCNet achieves excellent performance in both accuracy and efficiency. The experiments performed demonstrate that ABCNet can be run on an ordinary desktop with a single ordinary GPU, with practical times for both training and testing, and achieves superior accuracy compared to other state-of-the-art medical image segmentation methods for the task of body tissue composition analysis.

One limitation of this study is the small number of data sets utilized and the unicity of the data source. This was necessitated by the difficulty of manually segmenting the intricate and detailed patterns of VAT throughput the body torso especially in the thorax and abdomen and to a lesser extent also the muscle tissues. Even so, the number of studies employed is not out of line with the current practice dealing with similar tasks[25].

Figure 7:
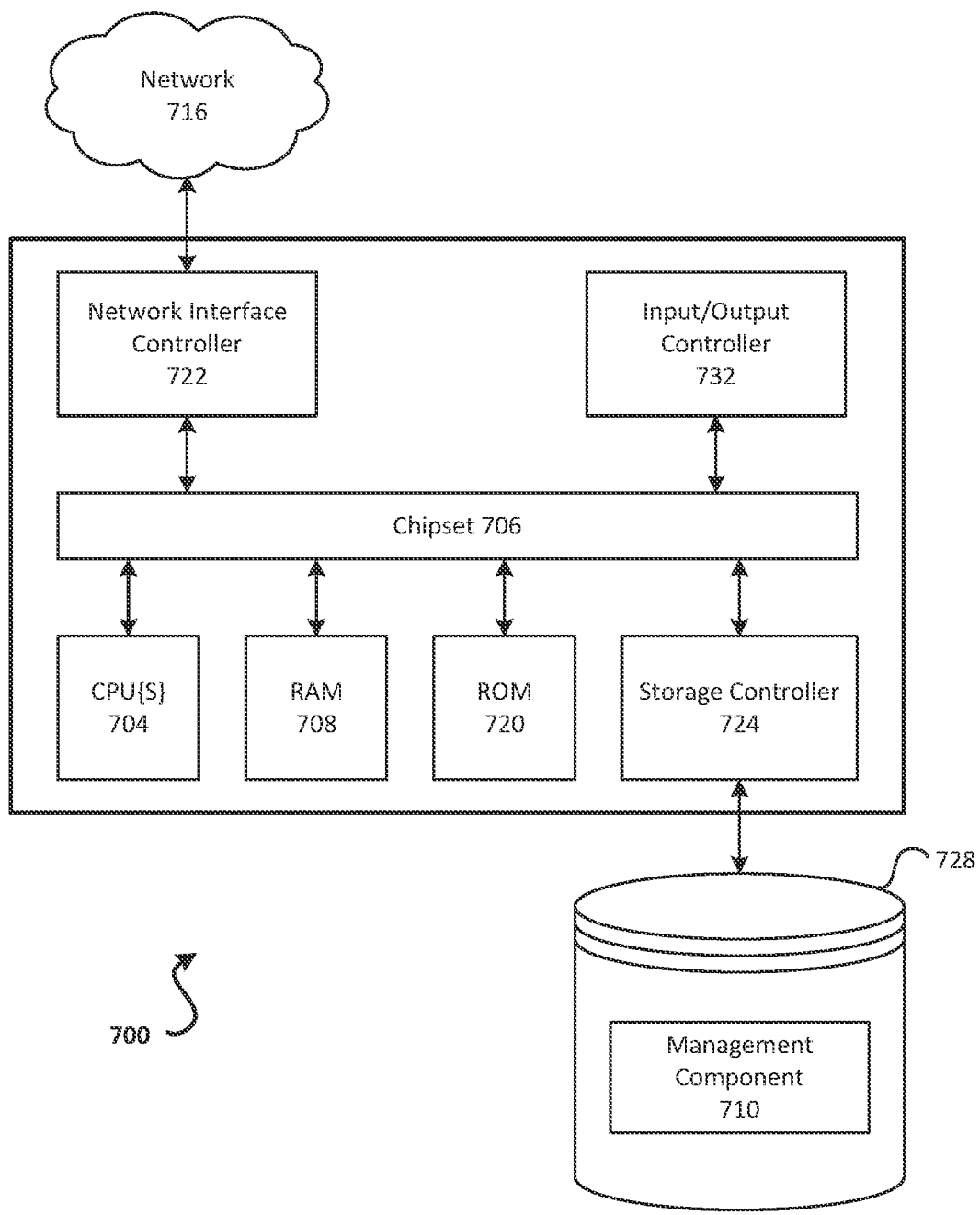
FIG. 7 is a block diagram illustrating an example computing device.

FIG. 7 depicts a computing device that may be used in various aspects, such as a computing device implementing a neural network, classification system, segmentation system, and/or the like. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may further provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may further read information from the mass storage device 728 by detecting the physical states or characteristics of one or more particular locations within the physical storage units.

In addition to the mass storage device 728 described above, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described above. The computing device 700 may have access to computer-readable storage media storing computer-executable instructions, which, when executed by the computing device 700, may perform the methods described herein.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The present disclosure can comprise at least the following aspects.

Aspect 1. A method, comprising, consisting of, or consisting essentially of: receiving imaging data associated with a patient; causing the imaging data to be input into a convolutional neural network stored on one or more computing devices; determining, based on output data resulting from inputting the imaging data into the convolutional neural network, body composition information; and causing output of the body composition information.

Aspect 2. The method of Aspect 1, wherein the imaging data comprises one or more of a computed tomography image or a low dose computed tomography image.

Aspect 3. The method of any one of Aspects 1-2, wherein the body composition information comprises data indicating whether a portion of the imaging data is indicative of one of a plurality of tissue categories.

Aspect 4. The method of Aspect 3, wherein the plurality of tissue categories comprise one or more of subcutaneous adipose tissue, visceral adipose tissue, muscle tissue, or skeletal tissue.

Aspect 5. The method of any one of Aspects 1-4, wherein the convolutional neural network comprises a filter that outputs a probability that a portion of the imaging data is indicative of subcutaneous adipose tissue, a probability that a portion of the imaging data is indicative of visceral adipose tissue, a probability that a portion of the imaging data is indicative of muscle tissue, and a probability that a portion of the imaging data is indicative of skeletal tissue.

Aspect 6. The method of any one of Aspects 1-5, wherein the imaging data comprises three-dimensional imaging data and the convolutional neural network comprises one or more filters configured to perform a convolution of the three-dimensional imaging data.

Aspect 7. The method of any one of Aspects 1-6, wherein the convolutional neural network comprises one or more dense blocks comprising a plurality of dense layers, and wherein an output of at least one layer of the plurality of dense layers is connected to an input of each following layer in a sequence of layers following the at least one layer.

Aspect 8. The method of Aspect 7, wherein the one or more dense blocks comprise a first dense block and a second dense block, and wherein an input of the second dense block comprises a down-sampled output of the first dense block, and wherein an output of the second dense block is up-sampled and combined with another output of the first dense block.

Aspect 9. The method of Aspect 7, wherein each of the one or more dense blocks is configured to output data to one or more corresponding bottleneck layers configured to reduce dimensionality of the corresponding output data.

Aspect 10. The method of any one of Aspects 1-9, wherein causing output of the body composition information comprises causing one or more of display of the body composition information, sending the body composition information to a computing device, or storing the body composition information.

Aspect 11. The method of any one of Aspects 1-10, wherein the convolutional neural network is trained based on imaging data associated with a plurality of different locations in patient bodies, wherein the imaging data comprise body-torso-wide CT imaging data.

Aspect 12. The method of any one of Aspects 1-11, wherein the convolutional neural network comprises one or more layers configured to segment objects corresponding to different tissue types.

Aspect 13. The method of any one of Aspects 1-12, wherein the convolutional neural network is trained based on definitions for different body regions, wherein the different body regions comprise one or more of a thoracic region, an abdominal region, a pelvic region, and a body torso region.

Aspect 14. The method of any one of Aspects 1-13, wherein the definitions specify instructions for delineating between the different regions applicable to imaging data for different patients.

Aspect 15. A device, comprising, consisting of, or consisting essentially of: one or more processors; and a memory storing instructions that, when executed by the one or more processors, cause the device to perform the methods of any one of Aspects 1-14.

Aspect 16. A non-transitory computer-readable medium storing instructions that, when executed by one or more processors, cause a device to perform the methods of any one of Aspects 1-14.

Aspect 17. A system, comprising, consisting of, or consisting essentially of: an imaging device configured to generate imaging data associated with a patient; and one or more processors configured to perform the methods of any one of Aspects 1-14.

REFERENCES

[1] Mazzoccoli G. Body composition: where and when. *Eur J Radiol.* 2016; 85: 1456-1460.

[2] Lemos T, Gallagher D. Current body composition measurement techniques. *Curr Opin Endocrinol Diabetes Obes.* 2017; 24(5): 310-314.

[3] Duda K, Majerczak J, Nieckarz Z, Heymsfield S B, Zoladz A. Human Body Composition and Muscle Mass. *Muscle and Exercise Physiology. Salt Lake City: Academic Press,* 2019; ch. 1, sec. 1, 3-26.

[4] Asghar A, Sheikh N. Role of immune cells in obesity induced low grade inflammation and insulin resistance. *Cell Immunol.* 2017; 315: 18-26.

[5] Anderson M R, Udupa J K, Edwin E A, et al. Adipose tissue quantification and primary graft dysfunction after lung transplantation: The Lung Transplant Body Composition Study. *J Heart Lung Transpl,* 2019; in press.

[6] Anderson M R, Kolaitis N, Kukreja J, et al. A non-linear relationship between visceral adipose tissue and frailty in adult lung transplant candidates. *Am J Transpl,* 2019; 19: 3155-3161.

[7] Shashaty, M G S, Kalkan E, Bellamy Scarlett L, et al. Computed tomography-defined abdominal adiposity is associated with acute kidney injury in critically ill trauma patients. *Crit Care Med,* 2014; 42: 1619-1628.

[8] Tong Y, Udupa J K, Sin S, et al. MR image analytics to characterize upper airway structure in obese children with obstructive sleep apnea syndrome, *PLOS ONE,* 2016; 11(8): e0159327.

[9] Fuchs G, Chretien Y R, Mario J, et al. Quantifying the effect of slice thickness, intravenous contrast and tube current on muscle segmentation: Implications for body composition analysis. *Eur Radiol.* 2018; 28(6): 1-9.

[10] Mcdonald A M, Swain T A, Mayhew D L, et al. C T Measures of Bone Mineral Density and Muscle Mass Can Be Used to Predict Noncancer Death in Men with Prostate Cancer. *Radiology.* 2017; 282(2): 475-483.

[11] Kershaw E E, Flier J S. Adipose tissue as an endocrine organ[J]. *J Clin Endocrinol Metab,* 2004; 89(6): 2548-2556.

[12] Fox C S, Massaro J M, Hoffmann U, Pou K M, Maurovich-Horvat P, Liu C-Y, et al. Abdominal visceral and subcutaneous adipose tissue compartments: association with metabolic risk factors in the Framingham Heart Study. *Circulation.* 2007; 116:39-48.

[13] Duren D L, Sherwood R J, Czerwinski S A, Lee M, Choh A C, Siervogel R M, Cameron Chumlea W. Body composition methods: comparisons and interpretation. *J. Diabetes Sci Technol.* 2008; 2: 1139-1146.

[14] Achamrah N, Jesuus P, Grigioni S, et al. Validity of Predictive Equations for Resting Energy Expenditure Developed for Obese Patients: Impact of Body Composition Method. *Nutrients.* 2018; 10(1): 63.

[15] Tewari N, Awad S, Macdonald I A, et al. A comparison of three methods to assess body composition. *Nutrition.* 2018; 47: 1-5.

[16] Mourtzakis K M D S M. A critical evaluation of body composition modalities used to assess adipose and skeletal muscle tissue in cancer. *Appl Physiol, Nutr, Metab.* 2012; 37(37): 811-821.

[17] Martinez-Martinez F, Kybic J, Lambert L, Mecková Z. Fully Automated Classification of Bone Marrow Infiltration in Low-Dose CT of Patients with Multiple Myeloma Based on Probabilistic Density Model and Supervised Learning. *Comput Biol Med.* 2016; 71(C): 57-66.

[18] Mourtzakis M, Prado C M M, Lieffers J R, et al. A practical and precise approach to quantification of body composition in cancer patients using computed tomography images acquired during routine care. *Appl Physiol, Nutr, Metab.* 2008; 33(5): 997-1006.

[19] Jeanson A L, Dupej J, Villa C, et al. Body composition estimation from selected slices: equations computed from a new semi-automatic thresholding method developed on whole-body CT scans. *Peerj.* 2017; 5: e3302.

[20] Cheng X, Zhang Y, Wang C, et al. The optimal anatomic site for a single slice to estimate the total volume of visceral adipose tissue by using the quantitative computed tomography (QCT) in Chinese population. *Eur J Clin Nutr.* 2018; 72(11): 1567-1575.

[21] Srikumar T, Siegel E M, Gu Y. et al. Semiautomated Measure of Abdominal Adiposity Using Computed Tomography Scan Analysis. *J Surg Res.* 2019; 237: 12-21.

[22] Kullberg J, Hedstrom A, Brandberg J, et al. Automated analysis of liver fat, muscle and adipose tissue distribution from CT suitable for large-scale studies. Sci Rep. 2017; 7(1): 10425.

[23] Tong Y, Udupa J K, Torigian D A. Optimization of Abdominal Fat Quantification on CT Imaging Through Use of Standardized Anatomic Space: A Novel Approach. *Med Phys.* 2014; 41(6): 063501.

[24] Popuri K, Cobzas D, Esfandiari N, et al. Body Composition Assessment in Axial CT Images Using FEM-Based Automatic Segmentation of Skeletal Muscle. *IEEE Trans Med Imaging.* 2016; 35(2): 512-520.

[25] Irmakci I, Hussein S, Savran A, et al. A Novel Extension to Fuzzy Connectivity for Body Composition Analysis: Applications in Thigh, Brain, and Whole Body Tissue Segmentation. *IEEE Trans Biomed Eng.* 2019; 66(4): 1069-1081.

[26] Kim Y J, Park J W, Kim J W, et al. Computerized Automated Quantification of Subcutaneous and Visceral

[26] ...Adipose Tissue From Computed Tomography Scans: Development and Validation Study. *JMIR Med Inf.* 2016; 4(1): e2.

[27] Hussein S, Green A, Watane A, et al. Automatic Segmentation and Quantification of White and Brown Adipose Tissues from PET/CT Scans. *IEEE Trans Med Imaging.* 2016; 36(3): 734-744.

[28] Ronneberger O, Fischer P, Brox T. U-Net: Convolutional Networks for Biomedical Image Segmentation. in *Proc MICCAI.* 2015; 234-241.

[29] Shelhamer E, Long J, Darrell T. Fully Convolutional Networks for Semantic Segmentation. *IEEE Trans Pattern Anal Mach Intell.* 2014; 39(4): 640-651.

[30] Weston A D, Korfatis P, Kline T L, et al. Automated Abdominal Segmentation of CT Scans for Body Composition Analysis Using Deep Learning. *Radiology.* 2019; 290: 669-679.

[31] Shen N, Li X, Zheng S, et al. Automated and Accurate Quantification of Subcutaneous and Visceral Adipose Tissue from Magnetic Resonance Imaging based on Machine Learning. *Magn Reson Imaging*, to be published.

[32] Bridge C P, Rosenthal M, Wright B, et al. Fully-Automated Analysis of Body Composition from CT in Cancer Patients Using Convolutional Neural Networks. in *Proc. Workshop MICCAI.* 2018; 204-213.

[33] Lee H, Troschel F M, Tajmir S, et al. Pixel-level deep segmentation: artificial intelligence quantifies muscle on computed tomography for body morphometric analysis. *J Digital Imaging.* 2017; 30(4): 487-498.

[34] Kamnitsas K, Ledig C, Newcombe V F J, et al. Efficient multi-scale 3D CNN with fully connected CRF for accurate brain lesion segmentation. *Med Image Anal.* 2016; 36: 61-78.

[35] Milletari F, Navab N, Ahmadi S A. V-Net: Fully Convolutional Neural Networks for Volumetric Medical Image Segmentation. in *Proc 3DV.* 2016; 565-571.

[36] Gibson E, Giganti F, Hu Y, et al. Automatic Multi-organ Segmentation on Abdominal CT with Dense V-networks. *IEEE Trans Med Imaging.* 2018; 37(8): 1822-1834.

[37] Özgün Çiçek, Abdulkadir A, Lienkamp S S, et al. 3D U-Net: Learning Dense Volumetric Segmentation from Sparse Annotation. in *Proc MICCAI.* 2016; 424-432.

[38] Liu T, Udupa J K, Miao Q, et al. Quantification of body-torso-wide tissue composition on low-dose CT images via automatic anatomy recognition. *Med Phys,* 2019, 46(3): 1272-1285.

[39] Huang G, Liu Z, Weinberger K Q, et al. Densely connected convolutional networks. in *Proc. CVPR.* 2017; 2261-2269.

[40] Ioffe S, Szegedy C. Batch Normalization: Accelerating Deep Network Training by Reducing Internal Covariate Shift. in *Proc ICML.* 2015, 448-456.

[41] Pleiss G, Chen D, Huang G, et al. Memory-Efficient Implementation of DenseNets. 2017, arXiv: 1707.06990v1, [online]. Available: https://arxiv.org/abs/1707.06990.

[42] He K, Zhang X, Ren S, et al. Identity Mappings in Deep Residual Networks. in *Proc ECCV.* 2016; 630-645.

[43] X. Glorot, A. Bordes, and Y. Bengio. Deep sparse rectifier neural networks. in *Proc AISTATS.* 2011; 315-323.

[44] Lin M, Chen Q, Yan S. Network in Network. 2015, arXiv:1312.4400, [online]. Available: https://arxiv.org/abs/1312.4400.

[45] Szegedy C, Liu W, Jia Y, et al. Going Deeper with Convolutions. in *Proc CVPR.* 2015; 1-9.

[46] Sze V, Chen Y H, Yang T J, et al. Efficient Processing of Deep Neural Networks: A Tutorial and Survey. *Proc. IEEE.* 2017; 105(12): 2295-2329.

[47] Sudre C H, Li W, Vercauteren T, et al. Generalised dice overlap as a deep learning loss function for highly unbalanced segmentations. in *Proc. Workshops DLMIA and ML-CDS.* 2017; 240-248.

[48] F. A. M Cappabianco, P. A. V. Miranda, and J. K. Udupa, A critical analysis of the methods of evaluating MRI brain segmentation algorithms, in *Proc ICIP.* 2017; 3894-3898.

[49] Loshchilov I, Hutter F. SGDR: Stochastic gradient descent with warm restarts. in *Proc ICLR.* 2017.

[50] Gibson E, Li W, Sudre C, et al. NiftyNet: a deep-learning platform for medical imaging. *Comput Meth Prog Bio,* 2018; 158: 113-122.

[51] Falcão A X, Udupa J K, Samarasekera S, et al. User-steered image segmentation paradigms: Live wire and live lane, *Graphical models and Image Process.* 1998; 60(4): 233-260.

[52] Grevera, G, Udupa, J K, Odhner, D, Zhuge, Y, Souza, A, Iwanaga, T and Mishra, S: CAVASS: A computer-assisted visualization and analysis software system, *J Digital Imaging.* 2007; 20: 101-118.

What is claimed:

1. A method, comprising:
receiving imaging data associated with a patient;
causing the imaging data to be input into a convolutional neural network stored on one or more computing devices, wherein the convolutional neural network comprises one or more dense blocks comprising a plurality of dense layers, and wherein an output of at least one layer of the plurality of dense layers is connected to an input of each following layer in a sequence of layers following the at least one layer;
determining, based on output data resulting from inputting the imaging data into the convolutional neural network, body composition information; and
causing output of the body composition information.

2. The method of claim 1, wherein the imaging data comprises one or more of a computed tomography image or a low dose computed tomography image.

3. The method of claim 1, wherein the body composition information comprises data indicating whether a portion of the imaging data is indicative of one of a plurality of tissue categories.

4. The method of claim 3, wherein the plurality of tissue categories comprises one or more of subcutaneous adipose tissue, visceral adipose tissue, muscle tissue, or skeletal tissue.

5. The method of claim 1, wherein the convolutional neural network comprises a filter that outputs a probability that a portion of the imaging data is indicative of subcutaneous adipose tissue, a probability that a portion of the imaging data is indicative of visceral adipose tissue, a probability that a portion of the imaging data is indicative of muscle tissue, and a probability that a portion of the imaging data is indicative of skeletal tissue.

6. The method of claim 1, wherein the imaging data comprises three-dimensional imaging data and the convolutional neural network comprises one or more filters configured to perform a convolution of the three-dimensional imaging data.

7. The method of claim 1, wherein the one or more dense blocks comprise a first dense block and a second dense block, and wherein an input of the second dense block comprises a down-sampled output of the first dense block, and wherein an output of the second dense block is up-sampled and combined with another output of the first dense block.

8. The method of claim 1, wherein each of the one or more dense blocks is configured to output data to one or more corresponding bottleneck layers configured to reduce dimensionality of the corresponding output data.

9. The method of claim 1, wherein causing output of the body composition information comprises causing one or more of display of the body composition information, sending the body composition information to a computing device, or storing the body composition information.

10. The method of claim 1, wherein the convolutional neural network is trained based on imaging data associated with a plurality of different locations in patent bodies, wherein the imaging data comprise body-torso-wide CT imaging data.

11. The method of claim 1, wherein the convolutional neural network comprises one or more layers configured to segment objects corresponding to different tissue types.

12. The method of claim 1, wherein the convolutional neural network is trained based on definitions for different body regions, wherein the different body regions comprise one or more of a thoracic region, an abdominal region, a pelvic region, and a body torso region.

13. The method of claim 12, wherein the definitions specify instructions for delineating between the different regions applicable to imaging data for different patients.

14. A device, comprising:
one or more processors; and
a memory storing instructions that, when executed by the one or more processors, cause the device to:
receive imaging data associated with a patient;
cause the imaging data to be input into a convolutional neural network stored on one or more computing devices, wherein the convolutional neural network comprises one or more dense blocks comprising a plurality of dense layers, and wherein an output of at least one layer of the plurality of dense layers is connected to an input of each following layer in a sequence of layers following the at least one layer;
determine, based on output data resulting from inputting the imaging data into the convolutional neural network, body composition information; and
cause output of the body composition information.

15. A system, comprising:
an imaging device configured to generate imaging data associated with a patient; and
one or more processors configured to:
receive imaging data associated with a patient;
cause the imaging data to be input into a convolutional neural network stored on one or more computing devices, wherein the convolutional neural network comprises one or more dense blocks comprising a plurality of dense layers, and wherein an output of at least one layer of the plurality of dense layers is connected to an input of each following layer in a sequence of layers following the at least one layer;
determine, based on output data resulting from inputting the imaging data into the convolutional neural network, body composition information; and
cause output of the body composition information.

* * * * *

UNITED STATES PATENT AND TRADEMARK OFFICE
CERTIFICATE OF CORRECTION

Page 1 of 1

PATENT NO. : 12,502,146 B2
APPLICATION NO. : 17/908730
DATED : December 23, 2025
INVENTOR(S) : Jayaram K. Udupa et al.

It is certified that error appears in the above-identified patent and that said Letters Patent is hereby corrected as shown below:

On the Title Page

In item (72) Inventors:
Under Column no. 1, Line no. 3, Replace:
"Chesterbroook,"
With:
--Chesterbrook,--

In the Specification

Under Column no. 13, Line no. 24, Replace:
"https://niftynetio/),"
With:
--https://niftynet.io/),--

Signed and Sealed this
Third Day of February, 2026

John A. Squires
*Director of the United States Patent and Trademark Office*